US012750838B2

(12) United States Patent
Huang et al.

(10) Patent No.: US 12,750,838 B2
(45) Date of Patent: Sep. 29, 2026

(54) TRIGGERING MECHANISMS FOR RADAR COEXISTENCE ENHANCEMENTS

(71) Applicant: INTERDIGITAL PATENT HOLDINGS, INC., Wilmington, DE (US)

(72) Inventors: Joe Huang, Montville, NJ (US); Philip Pietraski, Jericho, NY (US); Sudhir Pattar, Mount Laurel, NJ (US); Joseph Murray, Schwenksville, PA (US); Nicholas Podias, Brooklyn, NY (US); Alpaslan Demir, East Meadow, NY (US); Tariq Elkourdi, Belleville, NJ (US); Muhammad Fazili, Audubon, PA (US); Patrick Cabrol, Bayshore, NY (US); Paul Russell, Lawrence, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 265 days.

(21) Appl. No.: 18/709,381

(22) PCT Filed: Nov. 10, 2022

(86) PCT No.: PCT/US2022/049599
§ 371 (c)(1),
(2) Date: May 10, 2024

(87) PCT Pub. No.: WO2023/086507
PCT Pub. Date: May 19, 2023

(65) Prior Publication Data

US 2026/0164421 A1 Jun. 11, 2026

Related U.S. Application Data

(60) Provisional application No. 63/277,826, filed on Nov. 10, 2021.

(51) Int. Cl.
*H04W 72/044* (2023.01)
*H04B 7/06* (2006.01)
(Continued)

(52) U.S. Cl.
CPC ............ *H04W 72/046* (2013.01); *H04B 7/06* (2013.01); *H04B 7/08* (2013.01); *H04W 72/21* (2023.01); *H04W 72/23* (2023.01)

(58) Field of Classification Search
CPC ............... H04W 72/046; H04W 72/21; H04W 72/23–232; H04B 7/06; H04B 7/08
See application file for complete search history.

(56) References Cited

U.S. PATENT DOCUMENTS

| | | | | |
|---|---|---|---|---|
| 2007/0253394 A1 | 11/2007 | Horiguchi et al. | | |
| 2011/0281600 A1* | 11/2011 | Tanaka | H04B 7/024 455/500 | |

(Continued)

OTHER PUBLICATIONS

National Telecommunications and Information Administration, Technical Characteristics of Radiolocation Systems Operating in the 3.1-3.7 GHZ Band and Procedures for Assessing EMC with Fixed Earth Station Receivers, NTIA TR-99-361 (Dec. 1999).

(Continued)

*Primary Examiner* — Kevin C. Harper
(74) *Attorney, Agent, or Firm* — Volpe Koenig

(57) ABSTRACT

Methods and apparatuses are described herein for mitigating the effect of radar signals on wireless communication between a base station and a wireless transmit/receive unit (WTRU) and to mitigate the effect on a radar system of communication between the base station and the WTRU. The methods and apparatuses include beam nulling on transmit and receive by the WTRU.

20 Claims, 12 Drawing Sheets

(51) Int. Cl.

| | |
|---|---|
| ***H04B 7/08*** | (2006.01) |
| ***H04W 72/21*** | (2023.01) |
| ***H04W 72/23*** | (2023.01) |

(56) References Cited

U.S. PATENT DOCUMENTS

| | | | | |
|---|---|---|---|---|
| 2020/0076648 | A1 * | 3/2020 | Li ........................ | H04B 17/345 |
| 2021/0051660 | A1 | 2/2021 | Askar et al. | |

OTHER PUBLICATIONS

Third Generation Partnership Project, "Technical Specification Group Radio Access Network; NR; Radio Resource Control (RRC) protocol specification (Release 16)," 3GPP TS 38.331 V16.6.0 (Sep. 2021).

Third Generation Partnership Project, "Technical Specification Group Radio Access Network; NR; Radio Resource Control (RRC) protocol specification (Release 16)," 3GPP TS 38.331 V16.10.0 (Sep. 2022).

Third Generation Partnership Project, "Technical Specification Group Radio Access Network; NR; Radio Resource Control (RRC) protocol specification (Release 17)," 3GPP TS 38.331 V17.2.0 (Sep. 2022).

Third Generation Partnership Project, "Technical Specification Group Radio Access Network; NR; Physical layer procedures for data (Release 16)," 3GPP TS 38.214 V16.7.0 (Sep. 2021).

Third Generation Partnership Project, "Technical Specification Group Radio Access Network; NR; Physical layer procedures for data (Release 16)," 3GPP TS 38.214 V16.11.0 (Sep. 2022).

Third Generation Partnership Project, "Technical Specification Group Radio Access Network; NR; Physical layer procedures for data (Release 17)," 3GPP TS 38.214 V17.3.0 (Sep. 2022).

Third Generation Partnership Project, "Technical Specification Group Radio Access Network; NR; User Equipment (UE) procedures in Idle mode and RRC Inactive state (Release 16)," 3GPP TS 38.304 V16.6.0 (Sep. 2021).

Third Generation Partnership Project, "Technical Specification Group Radio Access Network; NR; User Equipment (UE) procedures in Idle mode and RRC Inactive state (Release 16)," 3GPP TS 38.304 V16.8.0 (Jun. 2022).

Third Generation Partnership Project, "Technical Specification Group Radio Access Network; NR; User Equipment (UE) procedures in Idle mode and RRC Inactive state (Release 17)," 3GPP TS 38.304 V17.2.0 (Sep. 2022).

Third Generation Partnership Project, "Technical Specification Group Radio Access Network; NR; User Equipment (UE) radio access capabilities (Release 16)," 3GPP TS 38.306 V16.6.0 (Sep. 2021).

Third Generation Partnership Project, "Technical Specification Group Radio Access Network; NR; User Equipment (UE) radio access capabilities (Release 16)," 3GPP TS 38.306 V16.10.0 (Sep. 2022).

Third Generation Partnership Project, "Technical Specification Group Radio Access Network; NR; User Equipment (UE) radio access capabilities (Release 17)," 3GPP TS 38.306 V17.2.0 (Sep. 2022).

Third Generation Partnership Project, "Technical Specification Group Radio Access Network; NR; Physical layer procedures for control (Release 16)," 3GPP TS 38.213 V16.7.0 (Sep. 2021).

Third Generation Partnership Project, "Technical Specification Group Radio Access Network; NR; Physical layer procedures for control (Release 16)," 3GPP TS 38.213 V16.11.0 (Sep. 2022).

Third Generation Partnership Project, "Technical Specification Group Radio Access Network; NR; Physical layer procedures for control (Release 17)," 3GPP TS 38.213 V17.3.0 (Sep. 2022).

* cited by examiner

TRIGGERING MECHANISMS FOR RADAR COEXISTENCE ENHANCEMENTS

CROSS-REFERENCE TO RELATED APPLICATIONS

This application is the U.S. National Stage, under 35 U.S.C. § 371, of International Application No. PCT/US2022/049599 filed Nov. 10, 2022, which claims the benefit of U.S. Provisional Application No. 63/277,826, filed Nov. 10, 2021 the contents of which are incorporated herein by reference.

SUMMARY

Methods and apparatuses for mitigating the effect of wireless communication on radar and the effect of radar on wireless communication systems are disclosed below. 5G systems can apply some or all of the following mitigation techniques to limit interference to and from the radar: Uplink and Downlink PRB Blanking including excluding downlink and uplink scheduling in the 5G system on PRBs experiencing Radar interference or potentially causing interference to Radar, for a selected subset of UEs or for all UEs within a cell; Uplink and Downlink Beam Nulling including introducing nulls in the most significant directions of radar signal's (Azimuth) Angle of Arrival (AoA) and/or Zenith of Arrival (ZoA) to mitigate the impacts of radar interference on a 5G system and a 5G system's interference on the radar; Uplink and Downlink Beam Nulling including introducing nulls in the most significant directions of radar signal's Azimuth AoA and/or ZoA to mitigate the impacts of radar interference on a WTRU and a WTRU's interference on the radar; Uplink Radar Pulse Squelching including suppressing the received IQ samples that are affected by high Radar interference to mitigate 5G uplink performance impact from Radar interference; and Uplink Power Control Adjustment, including reconfiguring power control parameters, for example, P0 and alpha and/or adjusting SINR target locally on the gNB to mitigate 5G uplink performance impact from Radar interference.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
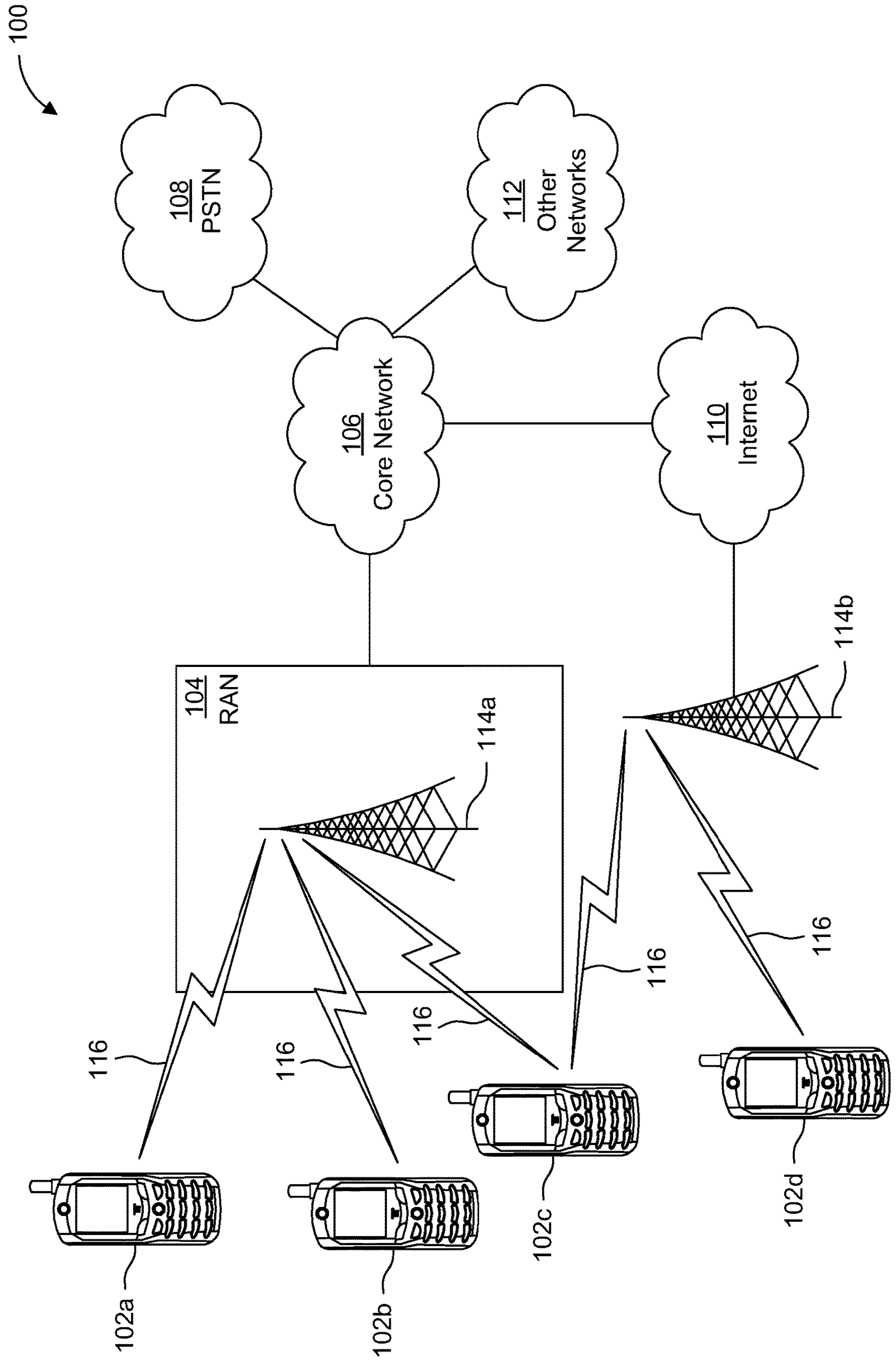
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
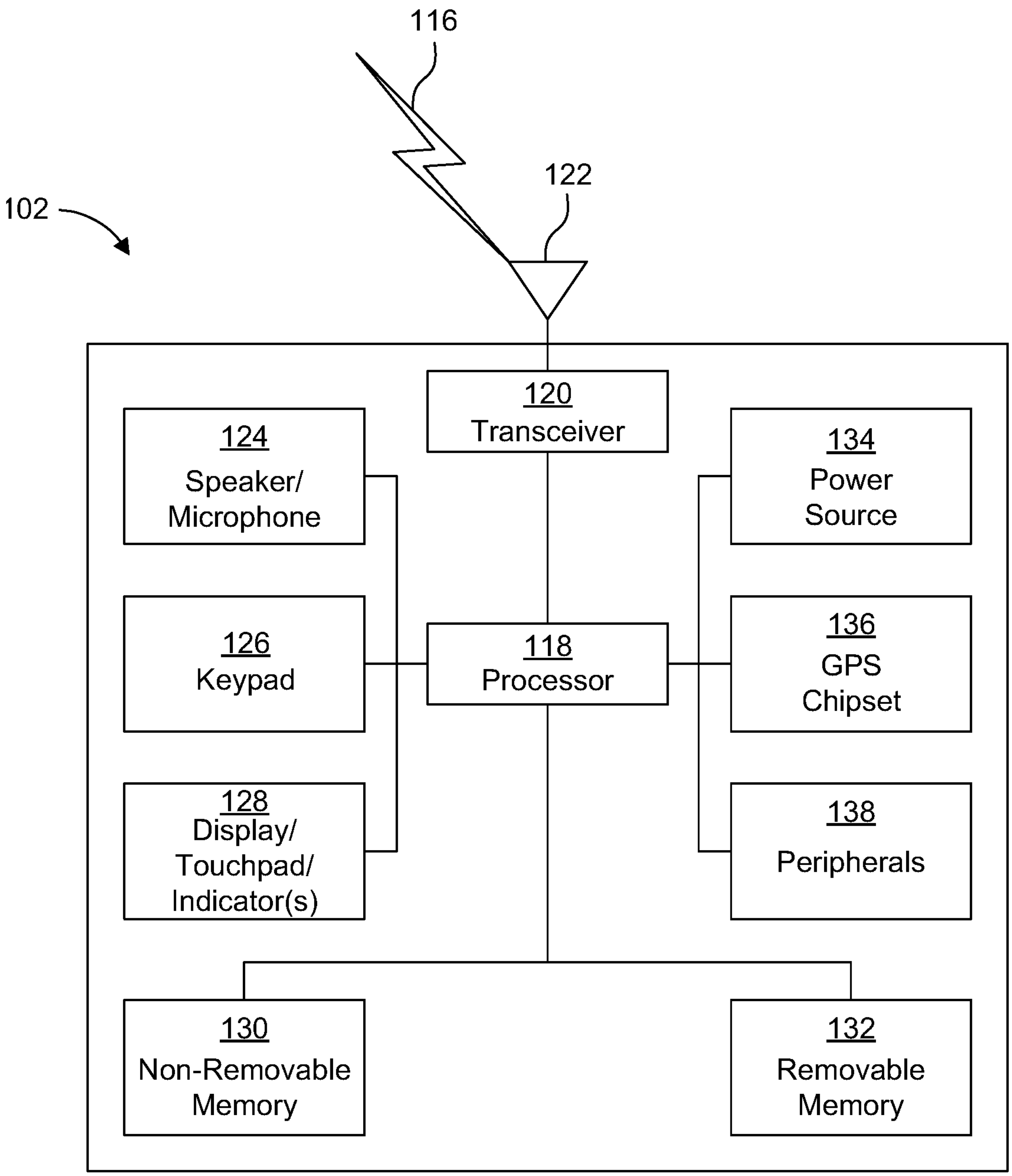
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
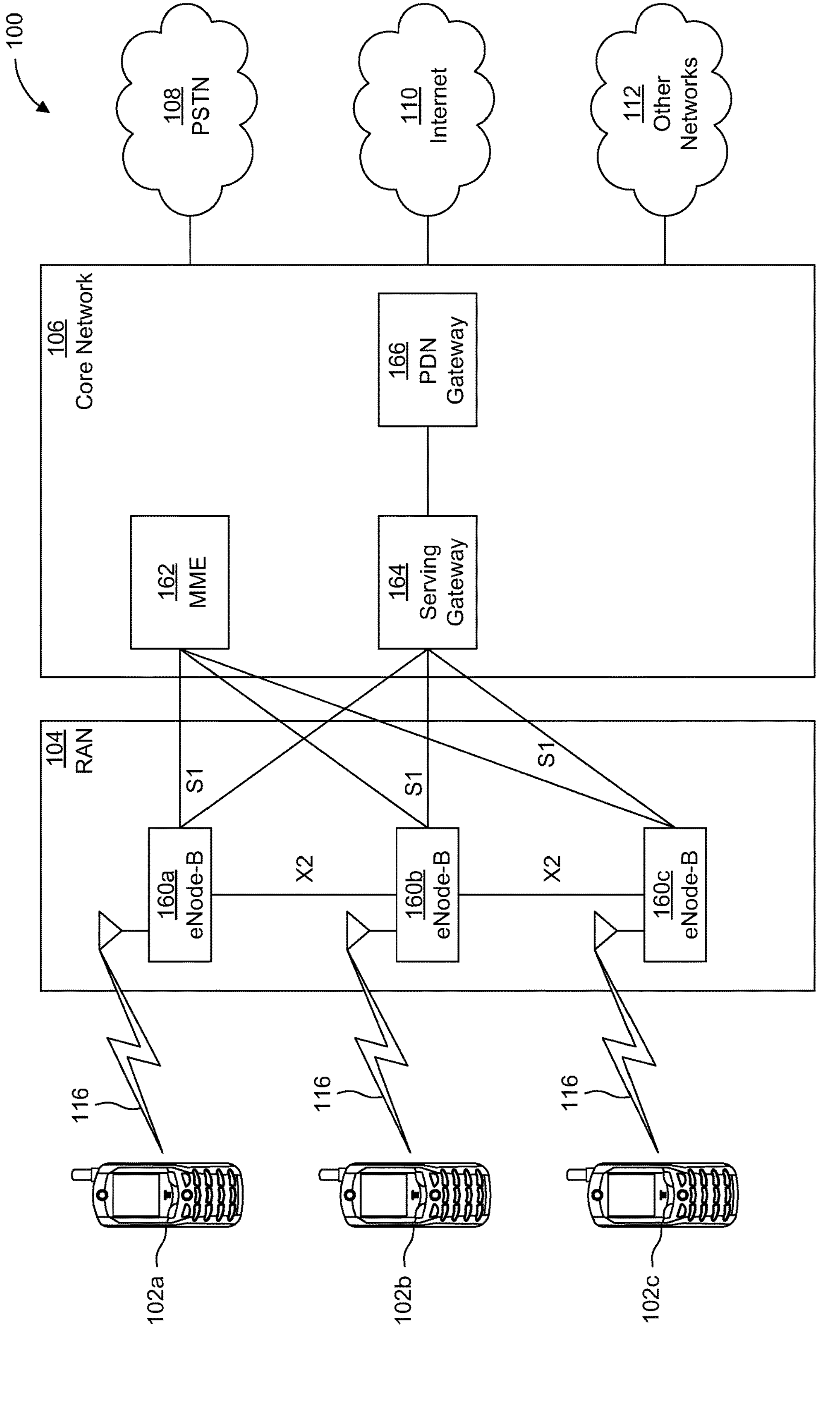
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.1 lac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
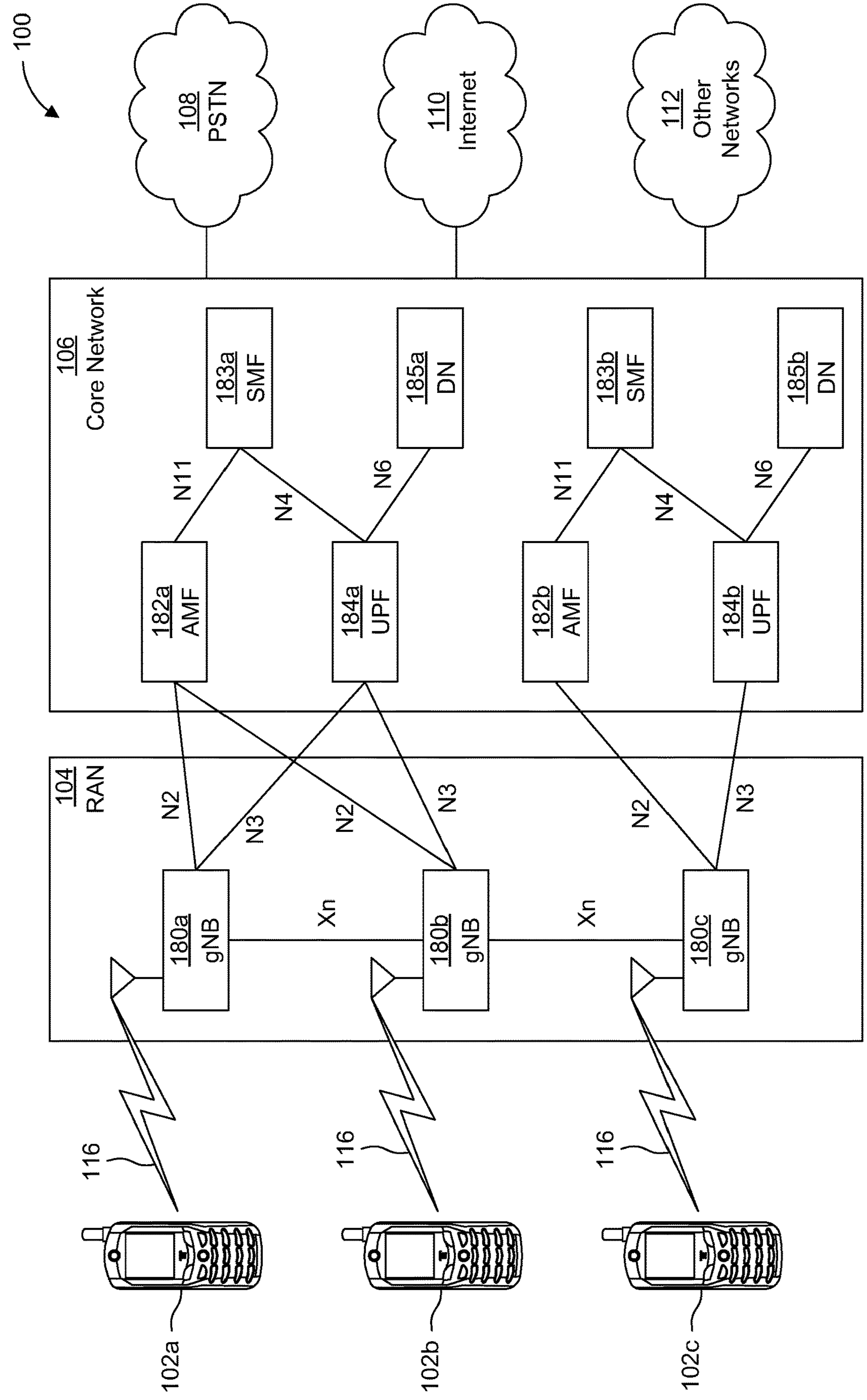
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182_a_, 182_b_ and the like. As shown in FIG. 1D, the gNBs 180_a_, 180_b_, 180_c_ may communicate with one another over an Xn interface.

The CN 106 shown in FIG. 1D may include at least one AMF 182_a_, 182_b_, at least one UPF 184_a_, 184_b_, at least one Session Management Function (SMF) 183_a_, 183_b_, and possibly a Data Network (DN) 185_a_, 185_b_. While the foregoing elements are depicted as part of the CN 106, it will be appreciated that any of these elements may be owned and/or operated by an entity other than the CN operator.

The AMF 182_a_, 182_b_ may be connected to one or more of the gNBs 180_a_, 180_b_, 180_c_ in the RAN 104 via an N2 interface and may serve as a control node. For example, the AMF 182_a_, 182_b_ may be responsible for authenticating users of the WTRUs 102_a_, 102_b_, 102_c_, support for network slicing (e.g., handling of different protocol data unit (PDU) sessions with different requirements), selecting a particular SMF 183_a_, 183_b_, management of the registration area, termination of non-access stratum (NAS) signaling, mobility management, and the like. Network slicing may be used by the AMF 182_a_, 182_b_ in order to customize CN support for WTRUs 102_a_, 102_b_, 102_c_ based on the types of services being utilized WTRUs 102_a_, 102_b_, 102_c_. For example, different network slices may be established for different use cases such as services relying on ultra-reliable low latency (URLLC) access, services relying on enhanced massive mobile broadband (eMBB) access, services for MTC access, and the like. The AMF 182_a_, 182_b_ may provide a control plane function for switching between the RAN 104 and other RANs (not shown) that employ other radio technologies, such as LTE, LTE-A, LTE-A Pro, and/or non-3GPP access technologies such as WiFi.

The SMF 183_a_, 183_b_ may be connected to an AMF 182_a_, 182_b_ in the CN 106 via an N11 interface. The SMF 183_a_, 183_b_ may also be connected to a UPF 184_a_, 184_b_ in the CN 106 via an N4 interface. The SMF 183_a_, 183_b_ may select and control the UPF 184_a_, 184_b_ and configure the routing of traffic through the UPF 184_a_, 184_b_. The SMF 183_a_, 183_b_ may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184_a_, 184_b_ may be connected to one or more of the gNBs 180_a_, 180_b_, 180_c_ in the RAN 104 via an N3 interface, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The UPF 184, 184_b_ may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102_a_, 102_b_, 102_c_ with access to the other networks 112, which may include other wired and/or wireless networks that are owned and/or operated by other service providers. In one embodiment, the WTRUs 102_a_, 102_b_, 102_c_ may be connected to a local DN 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 1A-1D, and the corresponding description of FIGS. 1A-1D, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In the following description the abbreviations shown below are used.

3GPP Third Generation Partnership Project
5G $5^{th}$ Generation
AoA Angle of Arrival
AWACS Airborne Warning & Control System
CBRS Citizens Broadband Radio Service
CONOPS CONcept of OPerationS
CORESET COntrol REsource SET
CSI-RS Channel State Information Reference Signal
CSMA Channel State Information
CUI Controlled Unclassified Information
DCI Downlink Control Information
DMRS Demodulation Reference Signal
EIRP Effective Isotropic Radiated Power
gNB NR NodeB
INR Interference to Noise Ratio
ITAR International Traffic in Arms Regulations
LBT Listen Before Talk
MAC Medium Access Control
MAC-CE MAC Control Element
MIB Master Information Block
MIMO Multiple Inputs Multiple Outputs
MVDR Minimum Variance Distortionless Response
MUSIC MUltiple SIgnal Classification
NR New Radio
NTIA National Telecommunications and Information Administration
OAM Operation, Administration and Maintenance OFDM Orthogonal Frequency-Division Multiplexing
PDCCH Physical Downlink Control Channel
PDSCH Physical Downlink Shared Channel
PO Paging Occasions
PRACH Physical Random-Access Channel
PRS Position Reference Signal
PSD Power Spectral Density
PUCCH Physical Uplink Control Channel
PUSCH Physical Uplink Shared Channel
PHY Physical Layer
radar Radio Detection and Ranging
RIV Resource Indicator Value
RRC Radio Resource Control
RSRP Reference Signal Received Power
PRB Physical Resource Block
RF Radio Frequency
SI System Information
SIB System Information Block
SINR Signal to Interference plus Noise Ratio
SRI SRS Resource Indicator
SRS Sounding Reference Signal
SSB SS/PBCH block
TPMI Transmit Precdoer Matrix Indicator
UE User Equipment 5G offers several features such as much faster communications (in terms of both data throughput and latency), vehicle-to-vehicle and vehicle-to-infrastructure uses, smart military bases, robotic surgeries, real time sensing of very large number of devices, etc. 5G is also more resilient and less susceptible to attacks than current 4G network. 5G also offers low hardware and software development costs because of the high commercial cost leverage. These makes 5G very useful for defense and private networks use. However, 5G was designed for deployment in licensed and dedicated spectrum where there are no challenges to the spectrum. As an exception, 5G does support operation in CBRS band, but the operation is still restricted to reserved spectrum as a secondary user. 5G operation in unlicensed band follows the LBT and CSMA mechanisms and is inefficient for wideband 5G operation and when the interferer is narrow band compared to 5G bandwidth.

Additionally, 5G was not designed for operation in highly congested and contested spectral environments and has jamming vulnerabilities. Coexistence of 5G with other systems operating in the same band requires enhancements to 3GPP standards to mitigate interference caused by 5G to the other system and vice versa. 5G supports powerful features such as beamforming and precoding techniques that can be used to limit the RF energy transmitted to and from a narrow band interferer, but these techniques require the knowledge of the Direction of Arrival of the interferer. Advanced signal processing techniques of interference cancellation require the knowledge of the waveform for interference cancellation. Knowledge and use of waveforms are restricted when the interferers are classified as Government assets.

One exemplary practical application accommodates radar interferers. Radars have very sensitive receivers and use very high gain antennas and are vulnerable to interference from 5G transmitters. This is the case even though devices implementing 5G technology transmit at low power compared to radar transmission power. Even these low power transmissions could interfere with critical radar operations. The 5G devices are likewise vulnerable to interference from radar transmitters. Radars can transmit high power, such as 90 dBm and are equipped with high gain antennas (such as 40 dBi gain), effectively resulting in high powered interference to 5G systems and devices.

Thus there is a further need for networks, systems, apparatus and methods including architectures, algorithms, and procedures by which devices and systems comprising advanced wireless networks such as 5G wireless systems, can coexist with particular kinds of interferers such as high powered radars and other similar interferers, even where the practical environment does not meet the ideal in which licensed and dedicated spectrum are available and there are no challengers like radar equipment operating within the same portions of the spectrum. The embodiments disclosed and described herein are suitable for implementation to maximize spectrum efficiency to allow more devices to operate in a limited spectrum, even in high SNR regions and highly congested and contested spectral environments. At the same time, the systems, methods and apparatus provide solutions to problems that arise and must be solved to achieve coexistence with interfering devices such as airborne radar.

Figure 1E:
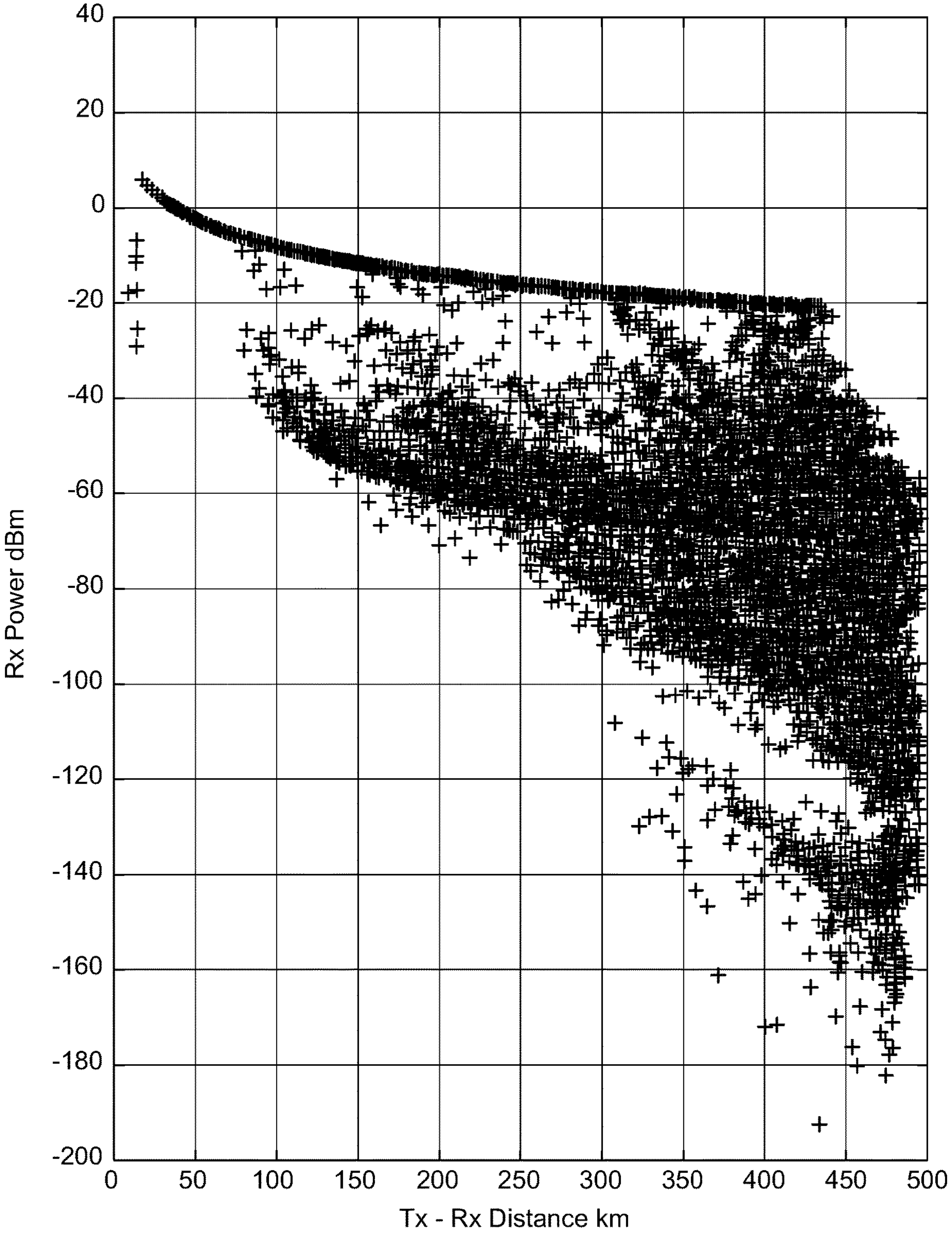
FIG. 1E is a graph of the interference levels from a radar on a 5G system.
Figure 1F:
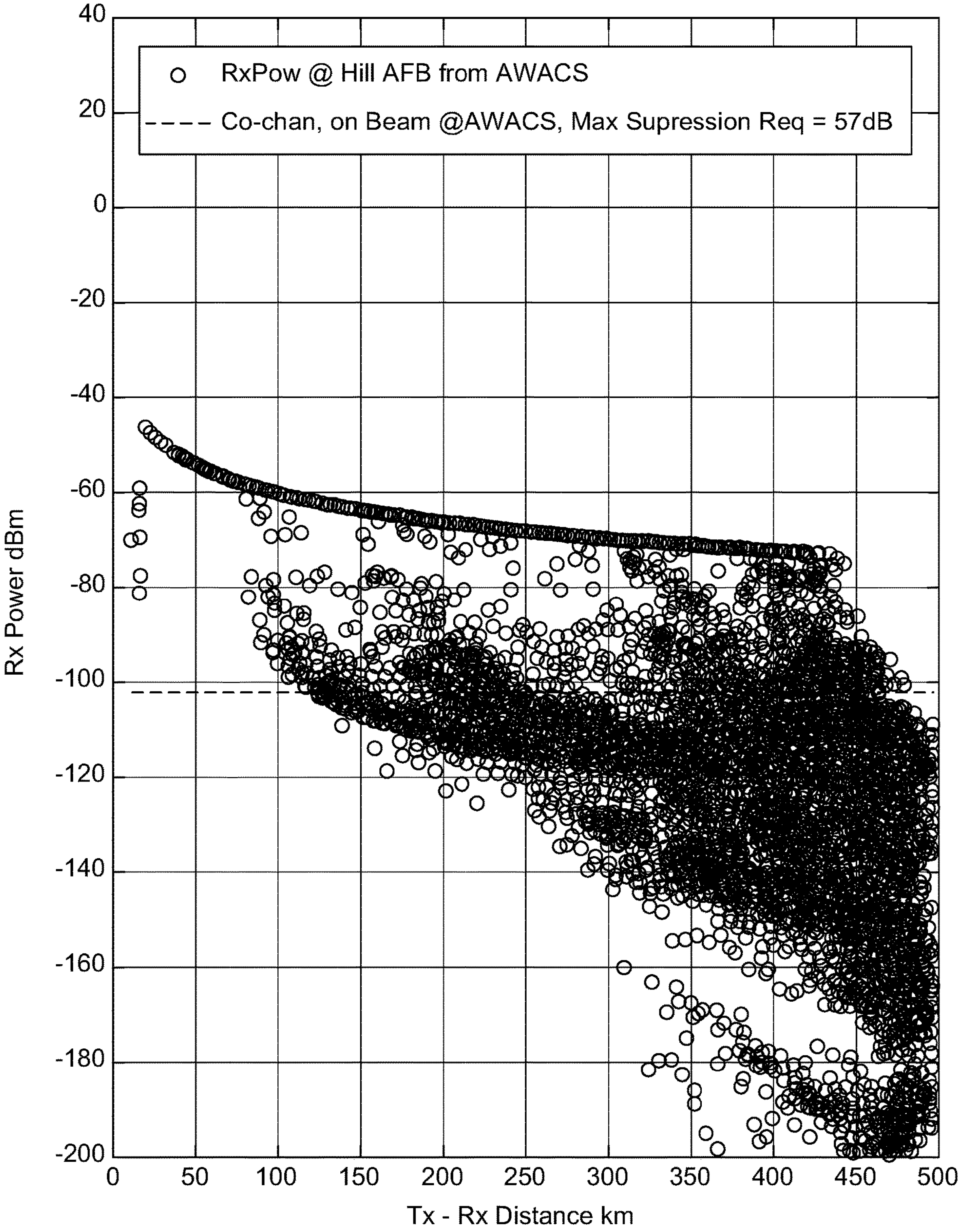
FIG. 1F is a graph of the interference levels from a 5G system on a radar.

FIG. 1E shows example interference levels at an example 5G receiver from a radar transmitting at 90 dBm from 10 Km height and operating with 40 dBi antenna when the radar beam is directed at the gNB. FIG. 1F illustrates the interference caused by 5G gNB to radar receivers for the case where the 5G gNB is transmitting at 38 dBm EIRP and 5G beams are directed at radar. The black dashed line indicates an exemplary interference threshold that is tolerable to the radar. Note that the interference levels are significantly higher than the threshold.

In addition, the interference from radar is highly directional and highly dynamic since the radar beam can sweep in both azimuth direction and elevation direction. The coexistence strategy needs to efficiently manage the dynamic interaction between the beam-based 5G system and highly directional high-power radar interference to ensure that the interference level from 5G system to radar is kept at an acceptably low level to meet the mandate from the incumbent radar operator, while managing the interference from radar to the 5G system to maintain robust and efficient 5G operation. To address this kind of problem, some embodiments provide a radar estimator device. A radar estimator device can be implemented in one or more nodes of a network. Alternatively, a radar estimator device can be implemented outside a network environment, and one or more nodes within a network configured to cooperate with the radar estimator device to receive data therefrom. For example, in some embodiments, the radar estimator device is configured to estimate or measure, or otherwise determine one or more radar parameters, including, for example, Radar Antenna Rotation Timing, Radar Pulse Timing, Radar pathloss, Radar Received PSD at a 5G cell, Radar AoA, ToA and coordinates, number or list of cells in radar main beam, and GPS timestamp. The radar estimator device can report or transmit one or more of the parameters to a node, management component or other component or system comprising a 5G network.

Figure 2:
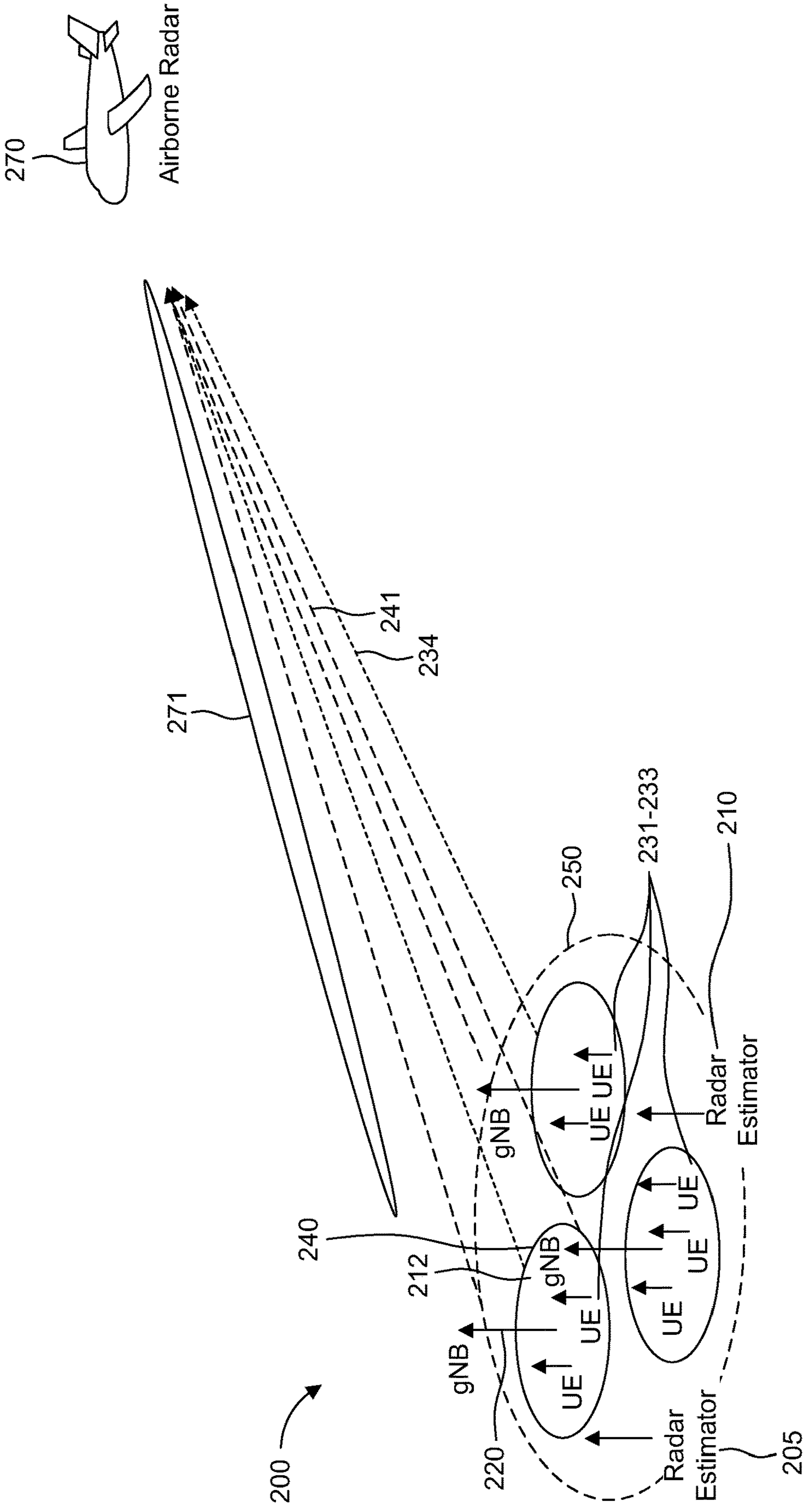
FIG. 2 is a high level pictorial diagram of a system for mitigating risk of harmful interference in the presence of an example radar interferer, including a cooperative arrangement of radar estimator devices according to embodiments.

FIG. 2 is a high-level block diagram of a system implementation according to embodiments. System 200 comprises a set 250 including a plurality of cells 240 (three shown, one indicated at 240). Each cell 240 belongs to a node (gNB) (three shown, one indicated at 220). A plurality of UE 231-233 operate in each of the cells 240. A plurality of radar estimator devices 205, 210 provide parametervalues as discussed in detail below.

An example interferer is an Airborne Warning and Control System (AWACS) radar 270, which operates within range of set 250 to cause interference 271. In this case, Airborne radar (as defined in Table 6 of Technical Characteristics of Representative 3.1-3.7 GHz Government Radars of NTIA specification TR-99-360), incorporated herein in its entirety by reference, operates anywhere the 3.1 to 3.7 GHz band. In embodiments in which an advanced network such as a 5G network operates in n78 band 3.3 to 3.8 GHz band, both in-band interference and adjacent band interference can be experienced.

Figure 3:
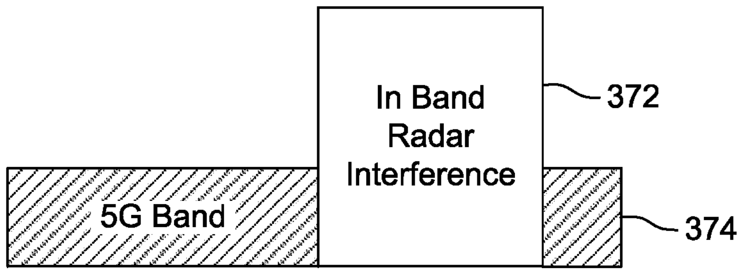
FIG. 3 is a block diagram showing in band radar interference according to embodiments.

FIG. 3 is a block diagram showing in-band radar interference 372 with respect to the 5G band 374 according to embodiments.

Figure 4:
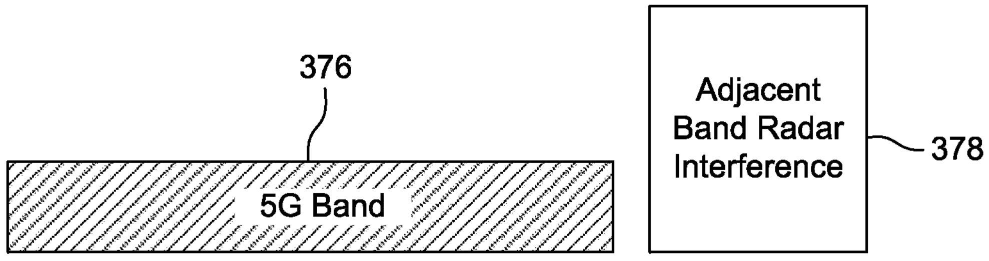
FIG. 4 is a block diagram showing adjacent band radar interference according to embodiments.

FIG. 4 is a block diagram showing adjacent band radar interference 378 with respect to the 5G band 376 according to embodiments.

Figure 5:
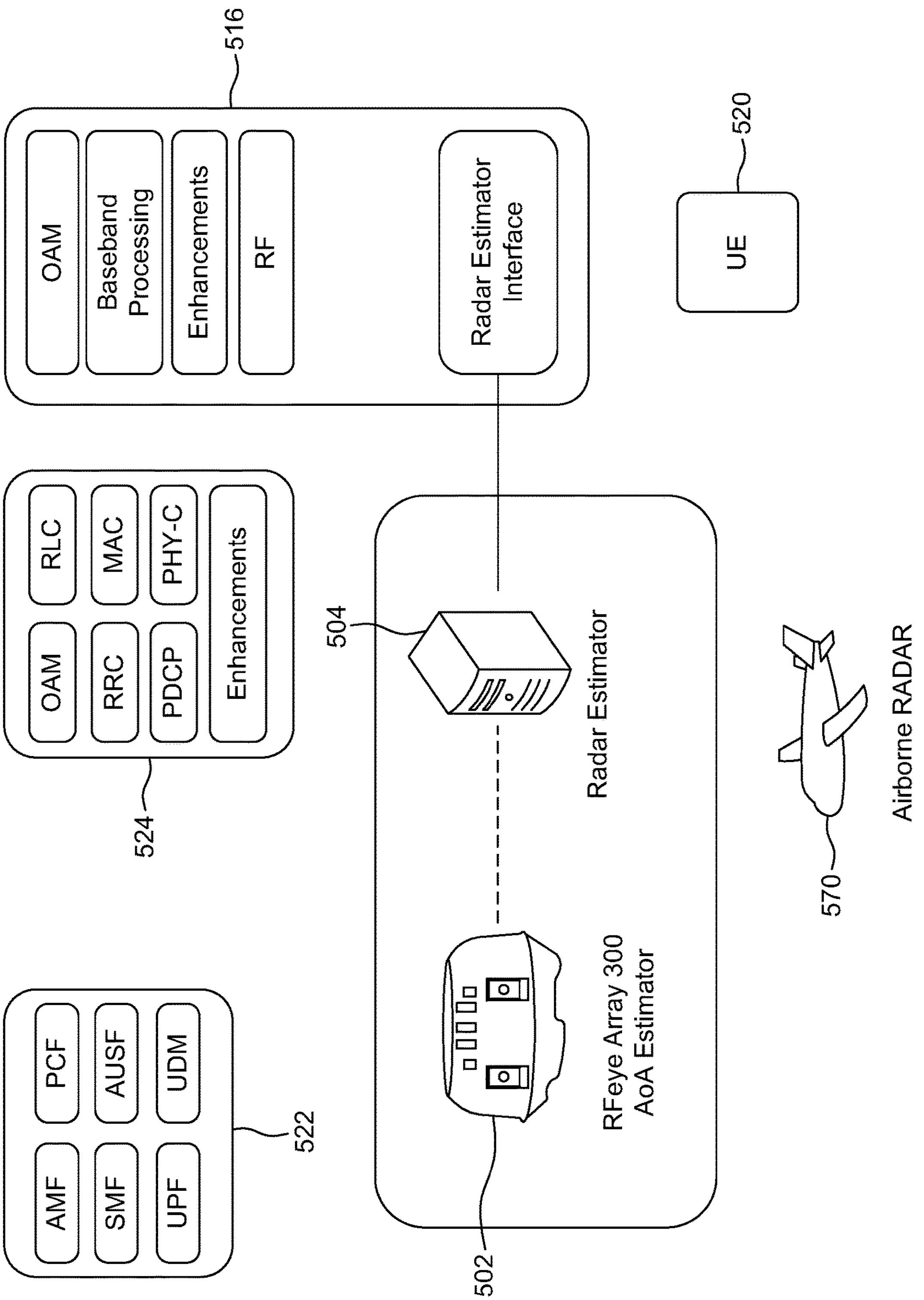
FIG. 5 is a block diagram showing an arrangement of components configured to cooperate to implement dynamic network reconfiguration actions according to embodiments.

FIG. 5 further illustrates a system according to embodiments including a radar estimator system component 504, in the context of a 5G implementation comprising a 5G Core Network 522+5G gNB ((CU+DU) 524+RU 516) and a plurality of UE 520. The Radar estimator system 504 continuously monitors the band of interest including the 5G band and the adjacent bands that cover radar operation for and detects the presence of radar, which can be an airborne radar 570 and reports the radar parameters to the 5G network. The radar sensor estimator 504 may be integrated into the RU 518, be consisted with the RU and share baseband HW, or be a fully separate physical entity. The radar estimator 504 can cooperate with an Angle of Arrival (AOA) estimator 502 to provide parameter values discussed in detail below. Node 524 is configured to cooperate with radar estimator 504 to receive parameters and information from the radar estimator. In some embodiments radar estimator 504 is configured to transmit at regular or scheduled periodic intervals. In other embodiments radar estimator 504 is configured to detect events in the environment such as sensed parameters in excess of thresholds, and to trigger a transmission in response to such events.

In some embodiments radar estimator 504 is configured to provide values for the parameters described below. In some embodiments the values are conveyed in messages, frames or other transport arrangements including fields corresponding to the parameters. Example parameters provided by a radar estimator apparatus and corresponding fields, according to embodiments, include at least one of the following.

5G systems can apply some or all of the following mitigation techniques to limit interference to and from a radar system:

Uplink and Downlink gNB Beam Nulling: In embodiments, this technique includes introducing nulls in the most significant directions of a radar signal's angles of arrival (AoA) when receiving uplink channels from WTRUs to mitigate 5G uplink throughput impact from radar interference. Embodiments include introducing nulls in the most significant directions of a radar signal's angles of arrival (AoA) when transmitting downlink channels to WTRUs such that the estimated aggregate interference from all 5G cells on the radar is below the acceptable level of interference to radar operation. The power reduction required is greatest when in the main beam and in the same band as the radar.

Figure 6:
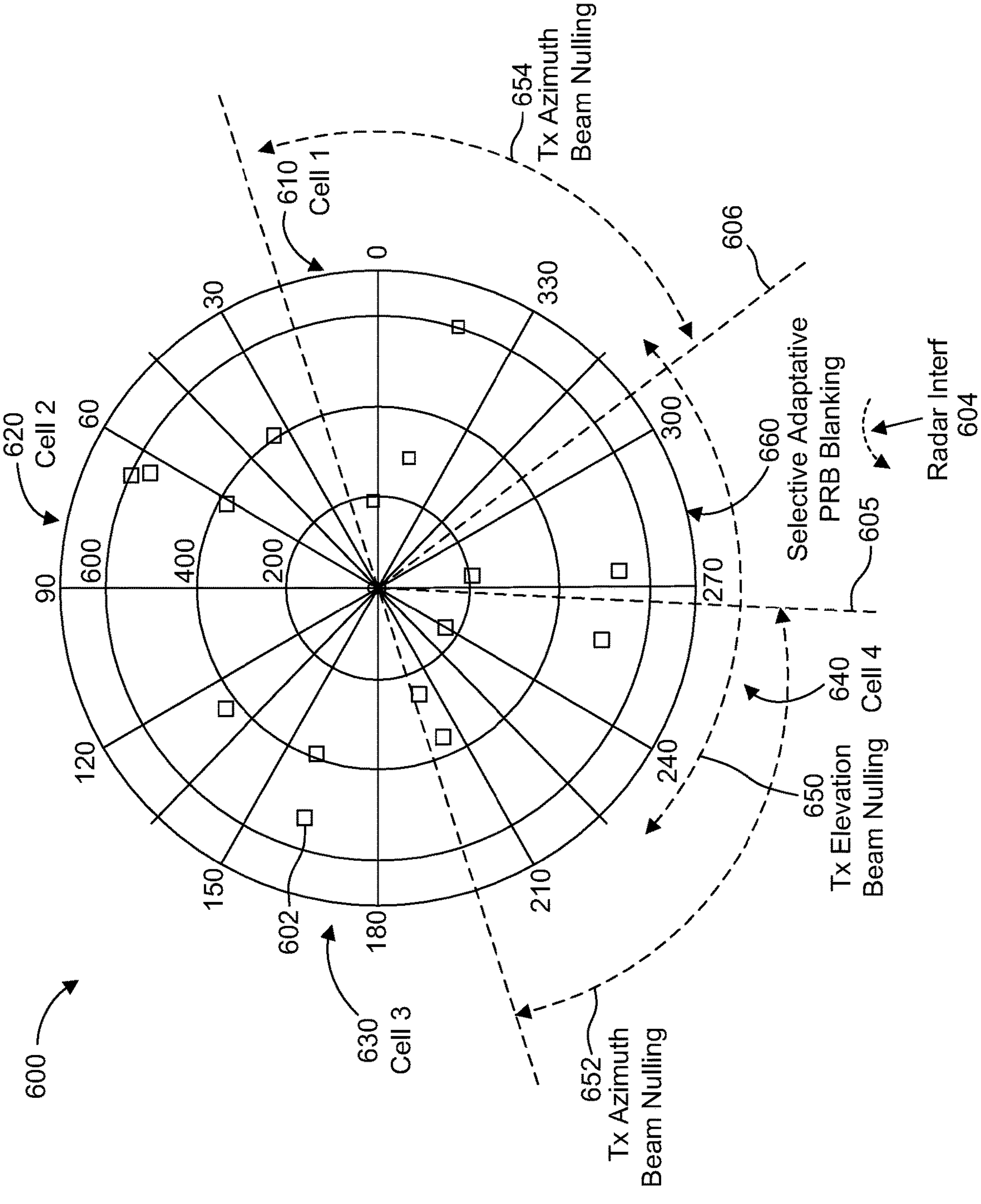
FIG. 6 is a diagram of a four cell wireless network.

FIG. 6 illustrates embodiments 600 for downlink coexistence strategies in the presence of radar interference 604. gNB operates cell 1, 610, cell 2, 620, cell 3, 630 and cell 4, 640. A plurality of WTRU 602 are present in each of the cells. The radar interference AoA is shown between labeled marker lines 270 and 300 degrees. In embodiments the gNB performs transmit azimuth beam nulling as described herein in the two regions labeled 652 and 654. In embodiments, the gNB also performs transmit elevation beam nulling in the analog domain when a radar source is close to the gNB such that the radar zenith of arrival (ZoA) is less than a ZoA threshold. This is illustrated in FIG. 6 in the region labeled 650. In embodiments, the gNB also performs selective (or WTRU-specific) adaptive PRB blanking 660 in cell 4, which is the cell in which the radar signal AoA is present. This technique is applied to mitigate both in-band and adjacent band interference from transmitting to WTRUs that are in close angular proximity to the radar source.

Figure 7:
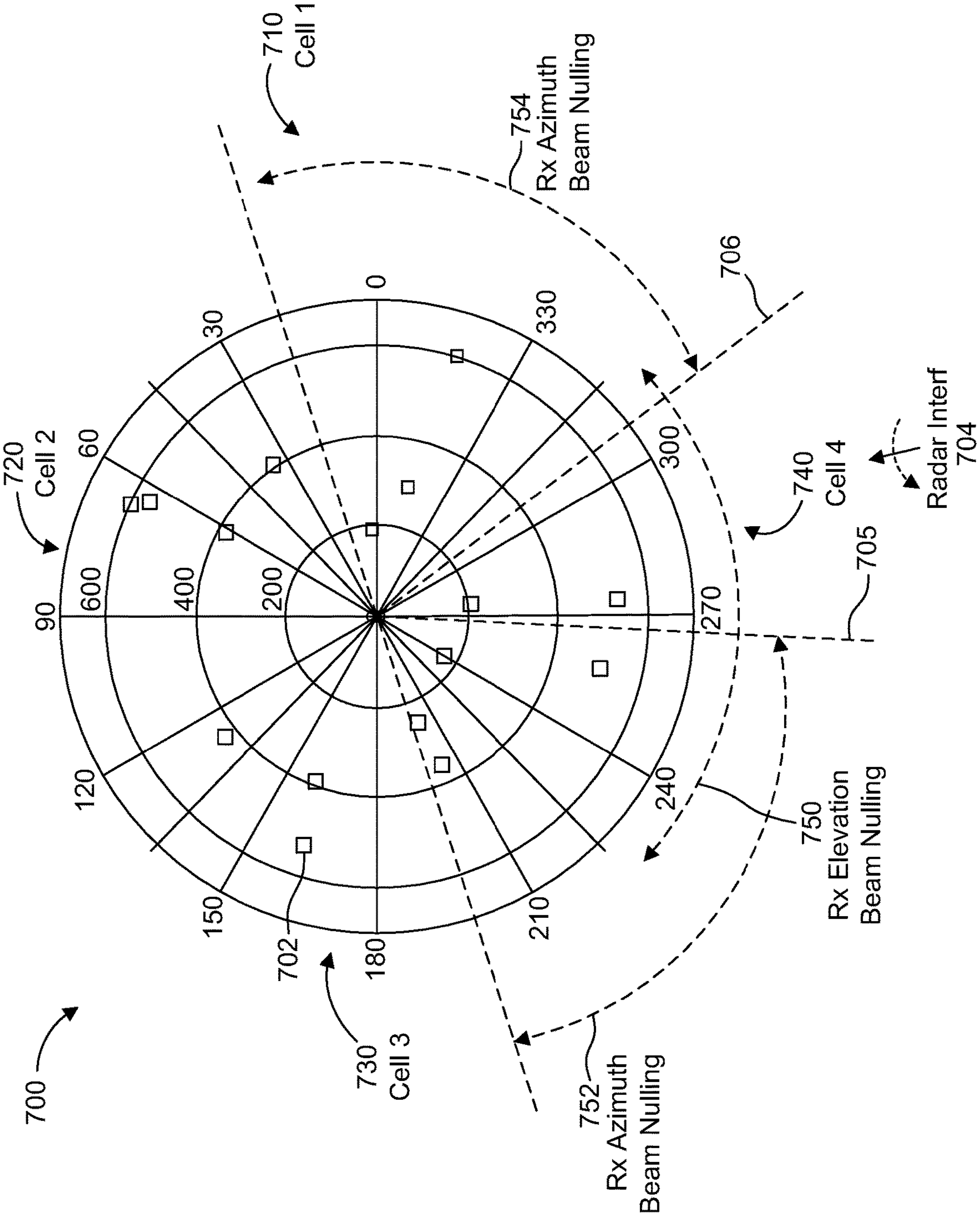
FIG. 7 is a further diagram of a four cell wireless network.

FIG. 7 illustrates embodiments 700 for uplink coexistence strategies in the presence of radar interference 704. gNB operates cell 1, 710, cell 2, 720, cell 3, 730 and cell 4, 740. A plurality of WTRU 702 are present in each of the cells. The radar interference AoA is shown between labeled marker lines 270 and 300 degrees. In embodiments the gNB performs receive azimuth beam nulling as described herein in the two regions labeled 752 and 754. In embodiments, the gNB also performs receive elevation beam nulling in the analog domain when a radar source is close to the gNB such that the radar zenith of arrival (ZoA) is less than a ZoA threshold. This is illustrated in FIG. 7 in the region labeled 750.

In embodiments, uplink and downlink WTRU beam nulling includes the gNB instructing the WTRU to perform uplink beam nulling in the most significant directions of a radar signal's angles of arrival (AoA) when transmitting uplink channels such that the interference from 5G WTRUs on the radar can be mitigated. In embodiments, the gNB instructs the WTRU to perform downlink beam nulling in the most significant directions of the radar signal's angles of arrival (AoA) when receiving downlink channels to mitigate 5G downlink throughput impact from radar interference.

PUSCH/PDSCH PRB Blanking: In embodiments, this technique includes excluding PUSCH scheduling in the 5G system on PRBs experiencing radar interference or potentially causing interference to radar, for a selected subset of WTRUs or for all WTRUs within a cell, such that the estimated aggregate interference from all WTRUs on the radar is below the acceptable level of interference to radar operation. Excluding PDSCH scheduling in the 5G system on PRBs experiencing radar interference or potentially causing interference to radar, for a selected subset of WTRUs or for all WTRUs within a cell, such that the estimated aggregate interference from all 5G cells on the radar is below the acceptable level of interference to radar operation.

PUSCH/PUCCH/SRS/PRACH Power Control Reconfiguration: In embodiments, this technique includes reconfiguring power control parameters, for example, P0 and alpha (via RRC signaling), P_PRACH-Target (via broadcast, e.g., SIB1, group-cast and/or dedicated RRC signaling). In the alternative or in combination, adjusting an SINR target locally on the gNB such that the estimated aggregate interference from all WTRUs on the radar is below the acceptable level of interference to radar operation may be performed. The power reduction required is greatest when in the main beam and in same band as the radar. Power control parameters, for example, P0 and alpha (via RRC signaling), P_PRACH-Target (via broadcast, e.g., SIB1, group-cast and/or dedicated RRC signaling) may be reconfigured. Additionally or alternatively, adjusting an SINR target locally on the gNB to mitigate 5G uplink channel performance impact from radar interference may be performed.

In embodiments, cell transmit power is adjusted. The transmit power of 5G cells may be controlled (along with the SS/PBCH block power indicated via SIB1) such that the estimated aggregate interference from all 5G cells on the radar is below the acceptable level of interference to radar operation. The power reduction required is greatest when in the main beam and in same band as the radar. The transmit power of 5G cells may be controlled (along with the SS/PBCH block power indicated via SIB1) to mitigate 5G downlink channel performance impact from radar interference (e.g., to mitigate adjacent band radar interference).

In embodiments, uplink squelching is performed to suppress the received IQ samples that are affected by radar interference to mitigate 5G uplink channel performance impact from radar interference.

In embodiments, Downlink Resource Reservation includes reserving a certain set of OFDM symbols (via RRC signaling) that coincide with estimated radar pulse timing to be excluded from downlink scheduling to mitigate 5G downlink channel performance impact from radar interference.

In embodiments, SSB/CORESET 0/PRACH PRB Relocation includes reconfiguring SSB/CORESET 0 (via broadcast, e.g., MIB/SIB1, group-cast and/or dedicated RRC signaling) and PRACH (via broadcast, e.g., SIB1, group-cast and/or dedicated RRC signaling) PRBs if any of these PRBs overlap with the detected radar bandwidth.

In embodiments, an SRS reconfiguration includes reconfiguring SRS PRB locations and/or periodicity (via RRC signaling) to mitigate interference to/from the radar.

In embodiments, a paging reconfiguration includes reconfiguring PF_OFFSET (via broadcast, e.g., SIB1, group-cast and/or dedicated RRC signaling) to avoid Paging Frames (PF) that may incur interference to/from the radar and/or reconfiguring a firstPDCCH-MonitoringOccasionOfPO (via broadcast, e.g., SIB1, group-cast and/or dedicated RRC signaling) for one or more of the Paging Occasions (POs) to avoid PDCCH monitoring occasions that may incur interference to/from the radar.

In embodiments, a PUCCH/PDCCH reconfiguration includes reconfiguring PUCCH Resources/ResourceSets (via RRC signaling) to mitigate interference to/from the radar and/or reconfiguring WTRU specific CORESET/Search Space allocations (via RRC signaling) to mitigate interference to/from the radar. It may be essential that these mitigation techniques be triggered timely and efficiently. In this regard, there is a need to design algorithms and procedures to trigger the appropriate mitigation techniques in response to the radar interference dynamics for coexistence of 5G wireless systems with radars.

In 5G communications, two different MIMO schemes are supported for PUSCH: codebook-based transmission and non-codebook-based transmission. The WTRU is configured with codebook-based transmission when the RRC parameter txConfig is set to "codebook"; the WTRU is configured with non-codebook-based transmission when the RRC parameter txConfig is set to "nonCodebook". For both UL MIMO schemes, every UL channel transmission has the UL DM-RS precoded the same way as data. In the case of non-codebook-based UL MIMO, the manner in which the PUSCH is precoded is not specified and the precoding itself is transparent to the gNB. In the case of codebook-based UL MIMO, the precoding follows the TPMI included in the UL grant; hence the precoding is non-transparent to the gNB.

In the case of non-codebook-based UL MIMO, the WTRU autonomously decides the precoding to use for each SRS port/resource. The SRI in the PUSCH scheduling grant selects a subset of, or all of, these SRS resources for transmission of PUSCH and the WTRU then transmits one MIMO layer for each indicated SRS resource. For example, if a rank one PUSCH transmission is scheduled, then the SRI selects a single SRS resource out of up to four SRS resources, and so on. To mitigate interference from a WTRU to radar, WTRU uplink beam nulling in the direction of radar can be incorporated in the precoding of the "nonCodebook" SRS resources. The WTRU then transmits the PUSCH layer in the same way as it transmitted the indicated SRS resource in the most recent SRS resource transmission. In embodiments, WTRU downlink beam nulling is weighted in the same way under the condition of UL-DL reciprocity.

The SRS-Config IE is used to configure SRS transmissions [TS 38.331]. The configuration defines a list of SRS-Resources and a list of SRS-ResourceSets. Each resource set defines a set of SRS-Resources. A WTRU may be configured with one or more Sounding Reference Signal (SRS) resource sets as configured by the higher layer parameter SRS-ResourceSet [TS 38.214]. For each SRS resource set configured by SRS-ResourceSet, a WTRU may be configured with K>1 SRS resources (higher layer parameter SRS-Resource), where the maximum value of K is indicated by WTRU capability [13, 38.306].

An SRS resource is configured by the SRS-Resource IE and consists of 1, 2, or 4 antenna ports, where the number of antenna ports is set by the higher layer parameter nrofSRS-Ports, and the number of consecutive OFDM symbols provided via nrofSymbols contained in the higher layer parameter resourceMapping. In the case of an SRS supporting more than one antenna port, the different ports share the same set of resource elements and the same basic SRS sequence. Different phase rotations are then applied to separate the different ports. The RRC parameters freqDomainShift and freqDomainPosition are used to position the SRS in the frequency grid.

An SRS can be configured for periodic, semi-persistent, or aperiodic transmissions. A periodic SRS is transmitted with a certain configured periodicity and a certain configured slot offset within that periodicity. A semi-persistent SRS has a configured periodicity and slot offset in the same way as a periodic SRS. Actual SRS transmission according to the configured periodicity is activated via MAC-CE signaling. An aperiodic SRS is only transmitted when explicitly triggered by DCI.

All SRS included within a configured SRS resource set have to be of the same type. In other words, periodic, semi-periodic or aperiodic transmission is a property of an SRS resource set. Activation/deactivation of semi-persistent or triggering of aperiodic SRS is not done for a specified SRS but is done for an SRS resource set.

```
SRS-ResourceSet ::=                 SEQUENCE {
  srs-ResourceSetId                   SRS-ResourceSetId,
  srs-ResourceIdList                    SEQUENCE (SIZE(1..maxNrofSRS-ResourcesPerSet))
OF SRS-ResourceId
  resourceType                        CHOICE {
    aperiodic                           SEQUENCE {
      aperiodicSRS-ResourceTrigger        INTEGER (1..maxNrofSRS-TriggerStates-1),
      csi-RS                                NZP-CSI-RS-ResourceId
      slotOffset                            INTEGER (1..32)
```

-continued

```
        ...,
        [[
        aperiodicSRS-ResourceTriggerList                    SEQUENCE (SIZE(1..maxNrofSRS-
TriggerStates−2))
                                                          OF   INTEGER   (1..maxNrofSRS-
TriggerStates−1)
        ]]
      },
      semi-persistent                          SEQUENCE {
        associatedCSI-RS                           NZP-CSI-RS-ResourceId
        ...
      },
      periodic                                 SEQUENCE {
        associatedCSI-RS                           NZP-CSI-RS-ResourceId
        ...
      }
    },
    usage                              ENUMERATED {beamManagement, codebook, nonCodebook,
antennaSwitching},
}
SRS-ResourceSetId ::=               INTEGER (0..maxNrofSRS-ResourceSets−1)
maxNrofSRS-ResourceSets           INTEGER ::= 16   -- Maximum number of SRS resource
sets in a BWP.
```

A device can be configured with multiple SRS resource sets that can be used for different purposes, including both downlink and uplink multi-antenna precoding and downlink and uplink beam management. The SRS resource set applicability is configured by the higher layer parameter usage in SRS-ResourceSet. When the "usage" parameter in the SRS resource set configuration is set to "nonCodebook," this set can have one, two or four SRS resources depending on UE capability and each resource has a single SRS port. Each "nonCodebook" SRS resource then represents a PUSCH MIMO layer. For example, if the WTRU supports only two-layer PUSCH transmission, then an SRS resource set with two SRS resources is configured.

In embodiments, to mitigate radar interference to and from WTRUs, a gNB can use the MAC-CE activation/deactivation command to semi-persistently trigger/update WTRU uplink (Tx) beam nulling on the "nonCodebook" SRS, PUSCH/DMRS and PUCCH/DMRS, as well as downlink (Rx) beam nulling on CSI-RS, PDSCH/DMRS and PDCCH/DMRS, as exemplified below (different bit arrangements can also be adopted):

- R/F/LCID (1 byte)
  - R: Reserved bit, which is set to 0
  - F: The format field (1 bit)
  - LCID: Logical Channel ID (6 bits)
- eLCID (1 or 2 bytes, 1 byte if LCID 33, 2 bytes if LCID=34)
  - Extended Logic Channel ID
  - A unique eLCID value (e.g., 256) may be used to identify the WTRU beam nulling activation/deactivation command.
- L (1 or 2 bytes, 1 byte if F=0, 2 bytes if F=1)
  - The length field indicating the length of the corresponding MAC SDU or variable sized MAC-CE in bytes
- Beam nulling type and angle information (2 bytes)
  - Beam nulling type (2 bits, 0: None, 1: Uplink only, 2: Downlink only, 3: Uplink and Downlink)
  - Beam nulling angle offset threshold (5 bits, 0 to 30 deg, step=1 deg)
  - Beam nulling angle (9 bits, 0 to 359 deg, step=1 deg), with respect to a reference coordinate system.
- Location and bandwidth of interfering PRBs (2 bytes, RIV)

More than one beam nulling angle may be configured by adding multiple "beam nulling angle" fields in the MAC-CE command. In this case, the significance of the beam nulling angles can be prioritized based on the order listed in the activation command.

Since the distance between a gNB and radar distance is expected to be much longer than that between gNB and WTRU, the radar AoA as seen by the gNB can be a good approximation to the AoA as seen by the WTRU. To facilitate beam nulling, the WTRU then transforms the beam nulling angle from the reference coordinate system to its own local coordinate system relative to its antenna array/panel. WTRUs can further perform autonomous measurement to fine-tune the radar AoA information provided by the gNB while taking into account the impact of the local scattering environment.

Alternatively, RRC signaling, dedicated or group common DCI signaling may be used to trigger WTRU beam nulling. The benefit of using semi-persistent MAC activation/deactivation is that MAC-CE can provide the necessary information about the radar interference information (e.g., AoA and interfering PRBs), which would be more difficult in the case of DCI signaling, as well as dynamically adapt to the changes of these interference characteristics, which would be more costly to do via frequent RRC signaling.

A gNB can also inform emerging and idle WTRUs about the bandwidth and AoA information of radar interference in SIB 1, as illustrated below.

```
DownlinkConfigCommonSIB ::=    SEQUENCE {
   frequencyInfoDL                FrequencyInfoDL-SIB,
   initialDownlinkBWP             BWP-DownlinkCommon,
   bcch-Config                    BCCH-Config,
   pcch-Config                    PCCH-Config,
```

-continued

```
  radarInterferenceInfo              SEQUENCE   (SIZE   (1..maxRadarInterf))   OF
RadarInterferenceInfo-SIB
  ...
}
RadarInterferenceInfo-SIB ::=          SEQUENCE {
  locationAndBandwidth               INTEGER (0..37949),
  angleOfArrivalList                 SEQUENCE   (SIZE   (1..maxAoAsPerRadarInterf))   OF
INTEGER (0..359)
}
```

In embodiments, an emerging WTRU uses the radar interference AoA information provided in the SIB1 and/or perform autonomous radar interference AoA estimation to perform uplink/downlink beam nulling toward radar during the random-access process, as needed, if the radar interference bandwidth overlaps with the random-access resources. The WTRU can also use other signal processing interference mitigation techniques to improve downlink reception during the random-access process.

In addition, in embodiments, a gNB informs idle WTRUs about the (updated) radar interference information in SIB 1 via an SI modification message, as shown in Table 1, below. The idle WTRU receives indications about SI modifications using Short Message transmitted in DCI format 1_0 with P-RNTI in the system info Modification bit. For Short Message reception in a paging occasion, the WTRU monitors the POOCH monitoring occasion(s) for paging as specified in TS 38.304 and TS 38.213. If a WTRU receives a Short Message with the systemInfoModification bit set to 1, the WTRU applies the SI acquisition procedure as defined in TS 38.331 sub-clause 5.2.2.3 from the start of the next modification period.

TABLE 1

| Field Name | # Bits | Comment |
|---|---|---|
| Short Messages Indicator | 2 | As defined in Table 2. |
| Short Messages | 8 | If only the scheduling information for Paging is carried, this bit field is reserved. |
| Frequency domain resource assignment | $\lceil \log_2(N_{RB}^{DL,BWP}(N_{RB}^{DL,BWP}+1)/2) \rceil$ | If only the short message is carried, this bit field is reserved. |
| Time domain resource assignment | 4 | As defined in section 5.1.2.1 of TS 38.214 If only the short message is carried, this bit field is reserved. |
| VRB-to-PRB mapping | 1 | As defined in Table 7.3.1.1.2-5 of TS 38.212 If only the short message is carried, this bit field is reserved. |
| Modulation and coding scheme | 5 | As defined in section 5.1.3 of TS 38.214 If only the short message is carried, this bit field is reserved. |
| TB scaling | 2 | As defined in section 5.1.3 of TS 38.214 FFIG If only the short message is carried, this bit field is reserved. |
| Reserved | 6 | |

Short Messages can be transmitted on POOCH using P-RNTI with or without associated Paging message using Short Message field in DCI format 1_0.

TABLE 2

| Bit | Short Message |
|---|---|
| 1 | systeminfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Not used in this release of the specification, and shall be ignored by WTRU if received. |

When the presence of radar interference is detected, or when the radar interference characteristics are updated, the gNB informs the idle and inactive WTRUs by sending out an SI modification message. The WTRU then reads the SIB 1 message to retrieve the latest radar interference information and performs an autonomous radar interference measurement, applies uplink/downlink beam nulling and/or other signal processing interference mitigation techniques, as needed.

To facilitate the triggering of WTRU beam nulling, WTRUs inform the gNB of their beam nulling supportability, as exemplified by the following information message shown in Table 3.

TABLE 3

| Definitions for parameters | Per | M | FDD-TDD DIFF | FR1-FR2 DIFF |
|---|---|---|---|---|
| downlinkBeamNulling<br>Indicates whether the WTRU supports downlink beam nulling | WTRU | No | No | No |
| uplinkBeamNulling<br>Indicates whether the WTRU supports uplink beam nulling | WTRU | No | No | No |

The following embodiments are disclosed to timely and efficiently trigger mitigation techniques for radar coexistence with 5G wireless systems. In some embodiments radar coexistence interference estimation is performed. In embodiments, the interference mitigation techniques described in the current disclosure are applied in a broader context. For example, the interference could be from an intentional signal jammer or signals from primary/high priority users or operators sharing the same spectrum.

In embodiments, full digital beamforming is performed, wherein a gNB estimates radar power spectral density and radar interference power on each cell as follows: Step 1: Estimate the received radar PSD per antenna element, wherein an antenna element is defined to include both polarizations in the case of cross polarization; Step 2: Average the received radar PSD over all antenna elements radarPsdOnCellAntElement; Step 3: Determine the total radar interference power for each cell radarPowerOnCellAntElement=sum over frequency the values of radarPsdOnCellAntElement (in the linear domain); Step 4: Estimate the angle of arrival (AoA) of radar interference; Step 5: Determine the element antenna gain in the radar AoA relative to the cell boresight direction for each cell cellAntElementRadarAoAGain; Step 6: Estimate the radar in-band bandwidth radarInBandBW=radar bandwidth that overlaps with the 5G carrier bandwidth based on the measured radar PSD; Step 7: Determine the total radar interference power within the radar in-band bandwidth for each cell radarInBandPowerOnCell=sum over frequency the values of radarPsdOnCellAntElement (in the linear domain) within radarInBandBW; Step 8: Determine the total radar interference power within the radar in-band bandwidth (with a configurable margin) radarPowerOnCell=radarInBandPowerOnCell+radarInterfOnCellMargin.

In the case of hybrid beamforming, gNB estimates radar power spectral density and radar interference power on each cell as follows: Step 1: Estimate the Rx radar PSD per analog beam (i.e., for each n-element analog column); Step 2: Average the Rx radar PSD over all m analog columns for each cell radarPsdOnCellAnalogBeam; Step 3: Determine the total radar interference power for each cell radarPowerOnCellAnalogBeam=sum over frequency the values of radarPsdOnCellAnalogBeam (in the linear domain); Step 4: Estimate the angle of arrival (AoA) of radar interference; Step 5: Determine the n-element analog column beamforming gain (including element gain) in the radar AoA relative to the cell boresight direction for each cell cellAnalogBeamRadarAoAGain; Step 6: Estimate the radar in-band bandwidth radarInBandBW=radar bandwidth that overlaps with the 5G carrier bandwidth based on the measured radar PSD; Step 7: Determine the total radar interference power within the radar in-band bandwidth for each cell radarInBandPowerOnCell=sum over frequency the values of radarPsdOnCellAnalogBeam (in the linear domain) within radarInBandBW; Step 8: Determine the total radar interference power within the radar in-band bandwidth (with a configurable margin) radarPowerOnCell=radarInBandPowerOnCell+radarInterfOnCellMargin. In embodiments, m and n may each equal 4.

An estimation of gNB interference on radar may be made. In the case of fully digital beamforming, gNB estimates the gNB interference power on radar as follows: Step 1: Estimate the interference power on radar per cell cellPowerOnRadar=maxCellTxPower+cellPathLossToRadar+10*log 10(numAntElements)+10*log 10(radarInBandBW/cellCarrierBandwidth)

cellPathLossToRadar=−(maxRadarTxPower−radarPowerOnCellAntElement). maxRadarTxPower is the assumed radar Tx power (configurable). maxCellTxPower is the maximum transmit power of the cell. The term 10*log 10(numAntElements) represents the maximum digital beamforming gain. cellCarrierBandwidth is the 5G carrier bandwidth of the cell.

Step 2: Estimate the interference power on radar per gNB gNBPowerOnRadar=sum (in the linear domain) of cellPowerOnRadar; Step 3: Send the estimated gNBPowerOnRadar (with any necessary time-averaging) to other gNBs via inter-gNB communication (or to a centralized entity to relay the information among gNBs); Step 4: Estimate the interference power on radar from all gNBs/cells that can potentially impact radar operation (with a configurable margin); gNBTotalPowerOnRadar=sum (in the linear domain) of gNBPowerOnRadar from all reported gNBs+gNBInterfOnRadarMargin.

In the case of hybrid beamforming, a gNB estimates the gNB interference power on radar as follows: Step 1: Estimate the interference power on radar per cell cellPowerOnRadar=maxCellTxPower+cellPathLossToRadar+10*log 10(numAnalogColumns)+10*log 10(radarInBandBW/cellCarrierBandwidth). cellPathLossToRadar=−(maxRadarTxPower−radarPowerOnCellAnalogBeam). maxRadarTxPower is the assumed radar Tx power (configurable). maxCellTxPower is the maximum transmit power of the cell. The term 10*log 10(numAnalogColumns) represents the maximum digital beamforming gain. cellCarrierBandwidth is the 5G carrier bandwidth of the cell. Step 2: Estimate the interference power on radar per gNB. gNBPowerOnRadar=sum (in the linear domain) of cellPowerOnRadar. Step 3: Send the estimated gNBPowerOnRadar (with any necessary time-averaging) to other gNBs via inter-gNB communication (or to a centralized entity to relay the information among gNBs). Step 4: Estimate the interference power on radar from all gNBs/cells that can potentially impact radar operation (with a configurable margin). gNBTotalPowerOnRadar=sum (in the linear domain) of gNBPowerOnRadar from all reported gNBs+gNBInterfOnRadarMargin.

In embodiments, an estimation of radar interference on the WTRU is made. In the case of fully digital beamforming, gNB estimates the radar interference power on WTRU as follows: Step 1: Estimate the radar power on a virtual omni-WTRU; radarInBandPowerOnOmniUE=The average of (radarInBandPowerOnCell−cellAntElementRadarAoAGain) over some or all cells (nominally including the radar facing cell) in a gNB. If the radar is incident on the azimuth boresight of the cell, the radarInBandPowerOnCell contributions from the other cells should be insignificant. If the radar is incident on the azimuth border of the cell, the radarInBandPowerOnCell contributions from two adjacent cells facing the radar can add up to make up for reduction in the element gain on the azimuth border. Step 2: Estimate the radar power on a WTRU (with a configurable margin).

radarPowerOnUe=radarInBandPowerOnOmniUE+radarInterfOnUeMargin. In the case of hybrid beamforming, gNB estimates the radar interference power on WTRU as follows:

Step 1: Estimate the radar power on a virtual omni-WTRU radarInBandPowerOnOmniUE=The average of (radarInBandPowerOnCell−cellAnalogBeamRadarAoAGain) over some or all cells (nominally including the radar facing cell) in a gNB. If the radar is incident on the azimuth boresight of the cell, the radarInBandPowerOnCell contributions from the other cells should be insignificant. If the radar is incident on the azimuth border of the cell, the radarInBandPowerOnCell contributions from two adjacent cells facing the radar can add up to make up for reduction in the element gain on the azimuth border. Step 2: Estimate the radar power on a WTRU (with a configurable margin) radarPowerOnUe=radarInBandPowerOnOmniUE+radarInterfOnUeMargin.

In embodiments, an estimation of WTRU interference on radar is made. A gNB estimates the WTRU interference power on radar as follows: Step 1: Estimate the interference power on radar per WTRU. uePowerOnRadar=maxUeTxPower+uePathLossToRadar. uePathLossToRadar=−(maxRadarTxPower−radarPowerOnOmniUe). maxRadarTxPower is the assumed radar Tx power (configurable). maxUeTxPower is the highest Tx power of the WTRU reported capability among all the connected WTRUs. Alternatively, maxUeTxPower may be a configurable parameter. Step 2: Estimate the aggregate WTRU interference power on radar per cell uePowerOnRadarPerCell=uePowerOnRadar+10*log 10(numSchedUEsPerSlotPerCell). numSchedUEsPerSlotPerCell can be based on the measured average number of uplink scheduled WTRUs per slot (avgSchedUEsPerSlot) per cell from gNB. Alternatively, numSchedUEsPerSlotPerCell can also be based on a configurable parameter. Step 3: Estimate the aggregate WTRU interference power on radar per gNB. uePowerOnRadarPerGNB=sum (in the linear domain) of uePowerOnRadarPerCell. Step 4: Sends the estimated uePowerOnRadarPerGNB to other gNBs via inter-gNB communication (or to a centralized entity to relay the information among gNBs). Step 5: Estimate the interference power on radar from all WTRUs (with a configurable margin). ueTotalPowerOnRadar=sum (in the linear domain) of uePowerOnRadarPerGNB+ueInterfOnRadarMargin.

Mechanisms to perform triggering of radar coexistence enhancements are disclosed. Uplink beam nulling can be used to mitigate the interference from radar to gNB within radar in-band bandwidth. It can also be used to mitigate the adjacent channel interference from radar to gNB when beam nulling is performed outside of the radar in-band bandwidth.

In embodiments, angle of arrival of an interfering signal from a WTRU is determined. The AoA of WTRU is an important piece of information to facilitate radar interference mitigation enhancement triggering decisions by the gNB. In embodiments, a gNB estimates the WTRU AoA via downlink reference signals such as SSB, CSI-RS or PRS based on the WTRU reported RSRP measurements on the corresponding beams. The direction associated with the strongest beam is identified as the WTRU AoA. In the case of digital beamforming or hybrid beamforming, a gNB can further fine tune the WTRU AoA by measuring SRS, PUCCH, PUSCH and/or DMRS using digital signaling processing techniques such as MVDR or MUSIC. In embodiments, the SRS resources configured for non-codebook-based PUSCH transmission to facilitate WTRU beam nulling toward radar are used by a gNB to measure the AoA of a WTRU.

In embodiments, gNB uplink beam nulling is triggered based on the following criteria. The estimated radar interference (within radarInBandBW) on the cell (radarPowerOnCell) exceeds the following threshold for a consecutive period of ulBeamNullingActTime. Thermal noise within radarInBandBW+cell noise figure+ulBeamNullingActInrMargin. When uplink beam nulling is triggered, gNB selects the uplink beam nulling eligible WTRUs of the triggered cell(s), among either the connected WTRUs or scheduled WTRUs, based on the following criteria: the offset between the azimuth AoA of the radar interference and the direction of the SSB/CSI-RS beam the WTRU is associated with is larger than or equal to the pre-configured threshold ulBeamNullingMinAzOffset. The offset between the azimuth AoA of the radar interference and the direction of the SSB/CSI-RS beam the WTRU is associated with is smaller than the pre-configured threshold ulBeamNullingMaxAzOffset. When the triggering criteria for uplink beam nulling are met on a cell, gNB applies beam nulling on uplink channels over all PRBs relevant to each uplink beam nulling eligible WTRU of that cell.

In embodiments, gNB uplink beam nulling is disabled based on the following criteria. The estimated radar interference (within radarInBandBW) on the cell (radarPowerOnCell) falls below the following threshold for a consecutive period of ulBeamNullingDeactTime. Thermal noise within radarInBandBW+cell noise figure+ulBeamNullingDeactInrMargin. When uplink beam nulling has been triggered on a cell and the disabling criteria for uplink beam nulling are met, gNB disables uplink beam nulling on that cell.

In embodiments, gNB downlink beam nulling is used to mitigate the interference from gNB to radar within radar in-band bandwidth. It can be used to mitigate the adjacent channel interference from gNB to radar when beam nulling is performed outside of the radar in-band bandwidth.

In embodiments, downlink beam nulling is triggered based on the following criteria. The estimated interference on radar (within radarInBandBW), from all "radar illuminated" cells (gNBTotalPowerOnRadar), exceeds the following threshold for a consecutive period of dlBeamNullingActTime. Thermal noise within radarInBandBW+radarInrTarget. When the triggering criteria for downlink beam nulling are met, the gNB selects the downlink beam nulling eligible WTRUs of the triggered cell(s), among either the connected WTRUs or scheduled WTRUs, based on the following criteria. The offset between the estimated azimuth AoA of the radar interference and the direction of the SSB/CSI-RS beam the WTRU is associated with is larger than or equal to the pre-configured threshold dlBeamNullingMinAzOffset. The offset between the estimated azimuth AoA of the radar interference and the direction of the SSB/CSI-RS beam the WTRU is associated with is smaller than the pre-configured threshold dlBeamNullingMaxAzOffset. When the triggering criteria for downlink beam nulling are met on a cell, the gNB applies downlink beam nulling over all PRBs relevant to each downlink beam nulling eligible WTRU of that cell.

In embodiments, downlink beam nulling is disabled based on the following criteria. The estimated interference on radar (within radarInBandBW), from all "radar illuminated" cells (gNBTotalPowerOnRadar), falls below the following threshold for a consecutive period of dlBeamNullingDeactTime. Thermal noise within radarInBandBW+radarInrTarget. When downlink beam nulling has been triggered on a cell and the disabling criteria for downlink beam nulling are met, gNB disables downlink beam nulling on that cell.

In embodiments, WTRU uplink (i.e., Tx) beam nulling is used to mitigate the interference from a WTRU to radar within radar in-band bandwidth. It can also be used to mitigate the adjacent channel interference from the WTRU to radar when WTRU uplink beam nulling is performed outside the radar in-band bandwidth. To facilitate WTRU uplink beam nulling, SRS resources for non-codebook-based PUSCH transmission should be configured to support consistent uplink MIMO operation and link adaptation.

In embodiments, WTRU uplink beam nulling is triggered based on the following criteria: The estimated interference on radar (within radarInBandBW), from all WTRUs associated with the radar illuminated cells (ueTotalPowerOnRadar), exceeds the following threshold for a consecutive period of ulUeBeamNullingActTime: Thermal noise within radarInBandBW+radarInrTarget.

Figure 8:
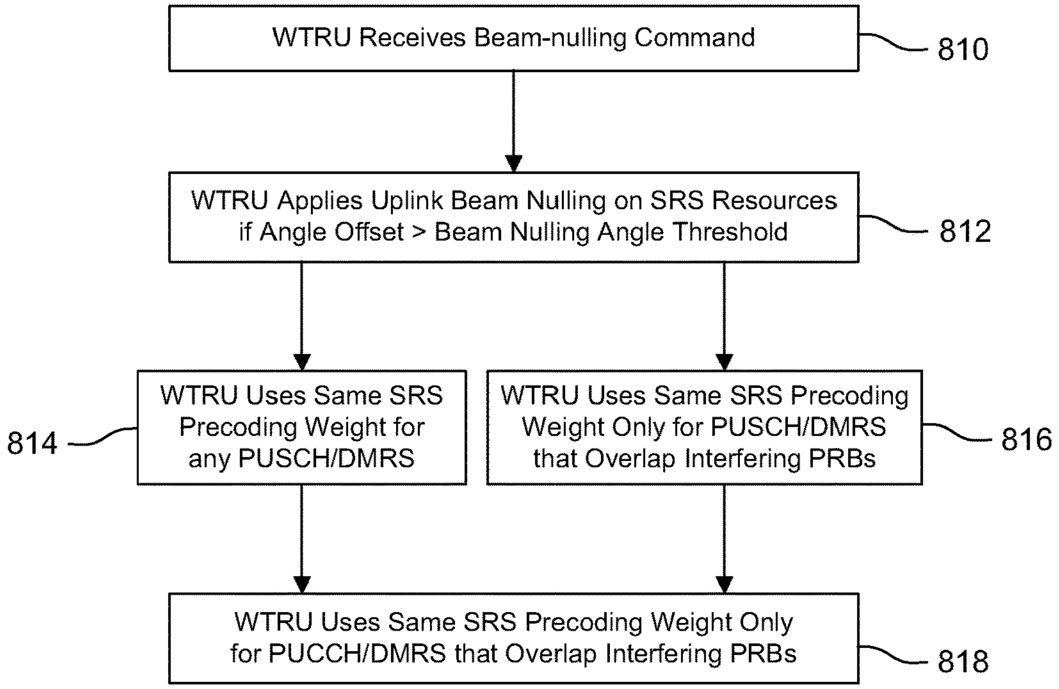
FIG. 8 is a flow diagram of an exemplary process for WTRU beam-nulling methods in the presence of interference.

In embodiments of UL beam nulling, as described in the flow chart of FIG. 8, at step 810, a gNB sends a beam nulling activation command to all or a subset of connected (beam nulling capable) WTRUs to enable WTRU uplink beam nulling, along with the beam nulling angle, beam nulling angle offset threshold and interfering PRB information. Any change of interference information (e.g., AoA) triggers an updated activation command.

At step 812 the WTRU applies uplink beam nulling on “nonCodebook” SRS resources if the SRS resources overlap with the interfering PRBs and if the azimuth angle offset (absolute value) between the beam nulling angle and the WTRU uplink communication angle is larger than the beam nulling angle offset threshold.

In an embodiment, at step 814 the WTRU further applies the same precoding weight that is used for the transmission of “nonCodebook” SRS resources to transmit any PUSCH/DMRS.

In an alternative embodiment, at step 816, the WTRU further applies the same precoding weight that is used for the transmission of “nonCodebook” SRS resources to transmit PUSCH/DMRS only if the scheduled PUSCH resources overlap with the indicated interfering PRBs.

In addition, at step 818 the UE may also apply uplink beam nulling on PUCCH/DMRS transmissions if the scheduled PUCCH resources overlap with the indicated interfering PRBs and if the azimuth angle offset (absolute value) between the beam nulling angle and the UE uplink communication angle is larger than the beam nulling angle offset threshold.

In embodiments, WTRU uplink beam nulling is disabled based on the following criteria:

The estimated interference on radar (within radarInBandBW), from all UEs associated with the “radar illuminated” cells (ueTotalPowerOnRadar), falls below the following threshold for a consecutive period of ulUeBeamNullingDeactTime: Thermal noise within radarInBandBW+radarInrTarget.

When WTRU uplink beam nulling has been triggered on a cell and the disabling criteria for WTRU uplink beam nulling are met, gNB sends beam nulling deactivation command to the relevant WTRUs to disable WTRU uplink beam nulling. The UE then disables uplink beam nulling on “nonCodebook” SRS, PUSCH/DMRS and PUCCH/DMRS.

In embodiments, WTRU downlink (i.e., Rx) beam nulling is used to mitigate the interference from radar to UE within radar in-band bandwidth. In embodiments, WTRU downlink beam nulling is also used to mitigate the adjacent channel interference from radar to a WTRU when WTRU downlink beam nulling is performed outside the radar in-band bandwidth.

In embodiments, WTRU downlink beam nulling is triggered based on the following criteria: The estimated radar interference (within radarInBandBW) on the WTRU (radarPowerOnUE) exceeds the following threshold for a consecutive period of dlUeBeamNullingActTime: Thermal noise within radarInBandBW+WTRU noise figure+dlUeBeamNullingActInrMargin.

Figure 9:
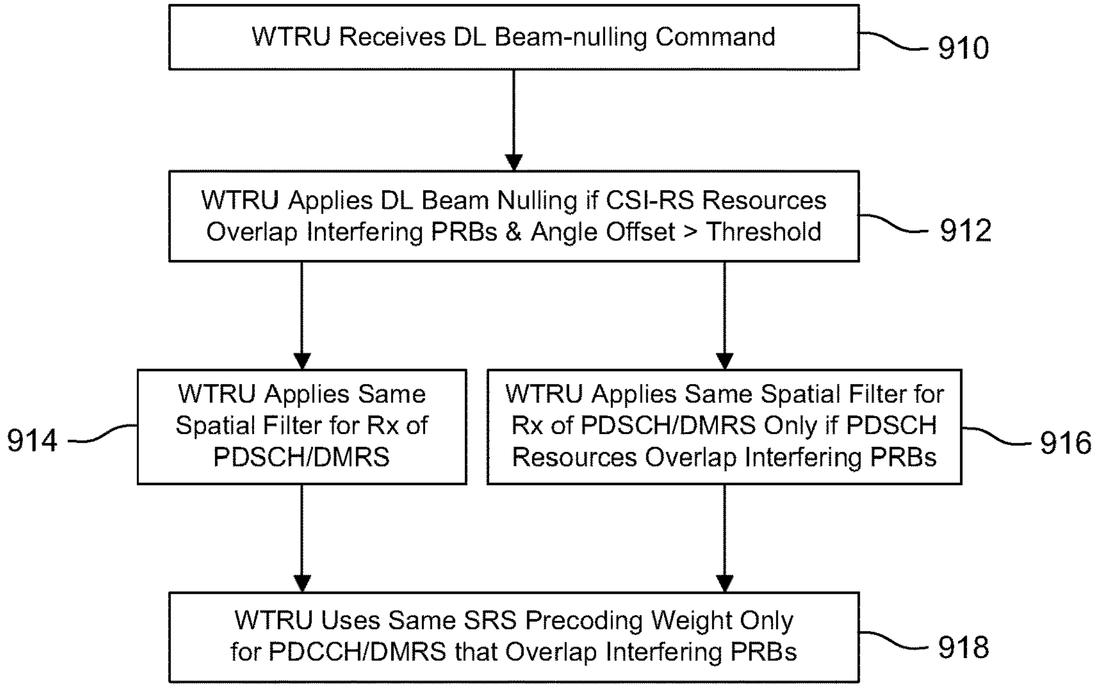
FIG. 9 is a flow diagram of a further exemplary process for WTRU beam-nulling methods in the presence of interference

In embodiments of WTRU downlink beam nulling, as shown in the flow chart of FIG. 9, at step 910 a gNB sends beam nulling activation command to all or a subset of connected (beam nulling capable) WTRUs to enable WTRU downlink beam nulling, along with the beam nulling angle, beam nulling angle offset threshold and interfering PRB information. Any change of interference information (e.g., AoA) will also trigger an updated activation command.

At step 912, the WTRU applies downlink beam nulling for the reception of CSI-RS if the CSI-RS resources overlap with the indicated interfering PRBs, and if the azimuth angle offset (absolute value) between the beam nulling angle and the WTRU downlink communication is larger than the beam nulling angle offset threshold.

In an embodiment, at step 914, the WTRU further applies the same spatial filter that is used for the reception of CSI-RS for the reception of any PDSCH/DMRS.

In an alternative embodiment, at step 916 the WTRU further applies the same spatial filter that is used for the reception of CSI-RS for the reception of PDSCH/DMRS only if the scheduled PDSCH resources overlap with the indicated interfering PRBs.

In addition, at step 918, the WTRU may also apply downlink beam nulling for the reception of PDCCH/DMRS if the PDCCH resources overlap with the indicated interfering PRBs, and if the azimuth angle offset (absolute value) between the beam nulling angle and the UE downlink communication is larger than the beam nulling angle offset threshold.

In embodiments, WTRU downlink beam nulling is disabled based on the following criteria: The estimated radar interference (within radarInBandBW) on the WTRU (radarPowerOnUE) falls below the following threshold for a consecutive period of dlUeBeamNullingDeactTime:Thermal noise within radarInBandBW+WTRU noise figure+dlUeBeamNullingDeactInrMargin. When WTRU downlink beam nulling has been triggered on a cell and the disabling criteria for WTRU downlink beam nulling are met, the gNB sends beam nulling deactivation command to the relevant WTRUs to disable WTRU downlink beam nulling. The WTRU disables downlink beam nulling for the reception of CSI-RS, PDSCH/DMRS and PDCCH/DMRS.

In embodiments, PUSCH PRB blanking is used to mitigate the interference from WTRU to radar and/or the interference from radar to gNB. In embodiments, PUSCH PRB blanking is triggered based on the following criteria. Criteria-A: The estimated radar interference (within radarInBandBW) on the cell (radarPowerOnCell) exceeds the following threshold for a consecutive period of puschPrbBlankingActTime. Thermal noise within radarInBandBW+cell noise figure+puschPrbBlankingActInrMargin. Criteria-B: The estimated interference on radar (within radarInBandBW), from all WTRUs associated with the “radar illuminated” cells (ueTotalPowerOnRadar), exceeds the following threshold for a consecutive period of puschPrbBlankingActTime. Thermal noise within radarInBandBW+radarInrTarget. When the triggering criteria-A for PUSCH PRB blanking are met, gNB selects the criteria-A PUSCH PRB blanking eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold puschPrbBlankingLowAzOffsetA. The offset between the azimuth AoA of the radar interference and the direction of the SSB/CSI-RS beam the WTRU is associated with is larger than the pre-configured threshold puschPrbBlankingHighAzOffsetA. If puschPrbBlankingLow AzOffsetA=puschPrbBlankingHighAzOffsetA, PUSCH PRB blanking may be applied to all WTRUs in the cell when triggering criteria-A are met.

When the triggering criteria-B for PUSCH PRB blanking are met, gNB selects the criteria-B PUSCH PRB blanking eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold puschPrbBlankingLowAzOffsetB. The offset between the azimuth AoA of the radar interference and the direction of the SSB/CSI-RS beam the WTRU is associated with is larger than the pre-configured threshold puschPrbBlankingHighAzOffsetB. If puschPrbBlankingLowAzOffsetB=puschPrbBlanking HighAzOffsetB, PUSCH PRB blanking may be applied to all WTRUs in the cell when triggering criteria-B are met. When the triggering criteria-A are met on a cell, gNB prohibits scheduling PRBs within the radarInBandBW over PUSCH to all criteria-A eligible WTRUs on that cell. When the triggering criteria-B are met on a cell, gNB prohibits scheduling PRBs within the radarInBandBW over PUSCH to all criteria-B eligible WTRUs on that cell.

In embodiments, PUSCH PRB blanking is disabled based on the following criteria: Criteria-A: The estimated radar interference (within radarInBandBW) on the cell (radarPowerOnCell) falls below the following threshold for a consecutive period of puschPrbBlankingDeactTime. Thermal noise within radarInBandBW+cell noise figure+puschPrbBlankingDeactInrMargin. Criteria-B: The estimated interference on radar (within radarInBandBW), from all WTRUs associated with the "radar illuminated" cells (ueTotalPowerOnRadar), falls below the following threshold for a consecutive period of puschPrbBlankingDeactTime. Thermal noise within radarInBandBW+radarInrTarget.

When only criteria-A have been triggered on a cell, and the disabling criteria-A are met, the gNB disables PUSCH PRB blanking on that cell. When only criteria-B have been triggered on a cell, and the disabling criteria-B are met, the gNB disables PUSCH PRB blanking on that cell. When both criteria-A and criteria-B have been triggered on a cell, and only the disabling criteria-A are met, the gNB disables PUSCH PRB blanking to WTRUs that are not criteria-B eligible on that cell. When both criteria-A and criteria-B have been triggered on a cell, and only the disabling criteria-B are met, the gNB disables PUSCH PRB blanking to WTRUs that are not criteria-A eligible on that cell. When both criteria-A and criteria-B have been triggered on a cell, and both the disabling criteria-A and criteria-B are met, the gNB disables PUSCH PRB blanking on that cell.

In embodiments, PDSCH PRB blanking is used to mitigate the interference from gNB to radar and/or the interference from radar to WTRU. PDSCH PRB blanking may be triggered based on the following criteria: Criteria-A: The estimated radar interference (within radarInBandBW) on the WTRU (radarPowerOnUe) exceeds the following threshold for a consecutive period of pdschPrbBlankingActTime. Thermal noise within estimated radar BW+WTRU noise figure+pdschPrbBlankingActInrMargin. Criteria-B: The estimated radar interference (within radarInBandBW), from all "radar illuminated" cells (gNBTotalPowerOnRadar), exceeds the following threshold for a consecutive period of pdschPrbBlankingActTime. Thermal noise within radarInBandBW+radarInrTarget. When the triggering criteria-A for PDSCH PRB blanking are met, gNB selects the criteria-A PDSCH PRB blanking eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold pdschPrbBlankingLowAzOffsetA. The offset between the azimuth AoA of the radar interference and the direction of the SSB/CSI-RS beam the WTRU is associated with is larger than the pre-configured threshold pdschPrbBlankingHighAzOffsetA. If pdschPrbBlankingLowAzOffsetA=pdschPrbBlankingHighAzOffsetA, PDSCH PRB blanking may be applied to all WTRUs in the cell when triggering criteria-A are met.

When the triggering criteria-B for PDSCH PRB blanking are met, gNB selects the criteria-B PDSCH PRB blanking eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold pdschPrbBlankingLowAzOffsetB. The offset between the azimuth AoA of the radar interference and the direction of the SSB/CSI-RS beam the WTRU is associated with is larger than the pre-configured threshold pdschPrbBlankingHighAzOffsetB. If pdschPrbBlankingLowAzOffsetB= pdschPrbBlankingHighAzOffsetB, PDSCH PRB blanking may be applied to all WTRUs in the cell when triggering criteria-B are met. When the triggering criteria-A are met on a cell, gNB prohibits scheduling PRBs within the radarInBandBW over PDSCH to all criteria-A eligible WTRUs on that cell. When the triggering criteria-B are met on a cell, gNB prohibits scheduling PRBs within the radarInBandBW over PDSCH to all criteria-B eligible WTRUs on that cell.

PDSCH PRB blanking may be disabled based on the following criteria: Criteria-A: The estimated radar interference (within radarInBandBW) on the WTRU (radarPowerOnUe) falls below the following threshold for a consecutive period of pdschPrbBlankingDeactTime. Thermal noise within radarInBandBW+WTRU noise figure+pdschPrbBlankingDeactInrMargin. Criteria-B: The estimated radar interference (within radarInBandBW), from all "radar illuminated" cells (gNBTotalPowerOnRadar), falls below the following threshold for a consecutive period of pdschPrbBlankingDeactTime. Thermal noise within radarInBandBW+radarInrTarget. When only criteria-A have been triggered on a cell, and the disabling criteria-A are met, gNB disables PDSCH PRB blanking on that cell. When only criteria-B have been triggered on a cell, and the disabling criteria-B are met, gNB disables PDSCH PRB blanking on that cell. When both criteria-A and criteria-B have been triggered on a cell, and only the disabling criteria-A are met, gNB disables PDSCH PRB blanking to WTRUs that are not criteria-B eligible on that cell. When both criteria-A and criteria-B have been triggered on a cell, and only the disabling criteria-B are met, gNB disables PDSCH PRB blanking to WTRUs that are not criteria-A eligible on that cell. When both criteria-A and criteria-B have been triggered on a cell, and both the disabling criteria-A and criteria-B are met, gNB disables PDSCH PRB blanking on that cell.

In embodiments, uplink squelching is used to mitigate the interference from radar to gNB. In embodiments, uplink squelching is triggered based on the following criteria: The estimated radar interference (within radarInBandBW) on the cell (radarPowerOnCell) exceeds the following threshold for a consecutive period of ulSquelchingActTime. Thermal noise within radarInBandBW+cell noise figure+ulSquelchingActInrMargin. When the triggering criteria for uplink squelching are met on a cell, gNB applies uplink squelching for all WTRUs on that cell.

In embodiments, uplink squelching is disabled based on the following criteria: The estimated radar interference (within radarInBandBW) on the cell (radarPowerOnCell) falls below the following threshold for a consecutive period of ulSquelchingDeactTime. Thermal noise within radarInBandBW+cell noise figure+ulSquelchingDeactInrMargin. When uplink squelching has been triggered on a cell and the uplink squelching disabling criteria are met, gNB disables uplink squelching on that cell.

In embodiments, downlink resource reservation is used to mitigate the interference from a radar to a WTRU. Downlink resource reservation may be triggered based on the following criteria: The estimated radar interference (within radarInBandBW) on the WTRU (radarPowerOnUe) exceeds the following threshold for a consecutive period of dlResourceReservActTime. Thermal noise within estimated radar BW+WTRU noise figure+dlResourceReservActInrMargin. When the triggering criteria for downlink resource reservation are met on a cell, DU RCE Processor applies downlink resource reservation for all WTRUs on that cell.

In embodiments, downlink resource reservation is disabled based on the following criteria: The estimated radar interference (within radarInBandBW) on the WTRU (radarPowerOnUe) falls below the following threshold for a consecutive period of dlResourceReservDeactTime. Thermal noise within radarInBandBW+WTRU noise figure+dlResourceReservDeactInrMargin. When downlink resource reservation has been triggered on a cell and the downlink resource reservation disabling criteria are met, gNB disables downlink resource reservation on that cell.

In embodiments, PUSCH/PUCCH/SRS power control SINR target adjustment on the gNB is used to mitigate the interference from radar to gNB and/or the interference from WTRUs to radar. It should be noted that separate configurable parameters can be defined for PUSCH, PUCCH, and SRS to allow individual control of different channels.

In embodiments, PUSCH/PUCCH/SRS SINR target adjustment are triggered based on the following criteria: Criteria-A: the estimated radar interference (within radarInBandBW) on the cell (radarPowerOnCell) exceeds the following threshold for a consecutive period of ulSinrTargetModActTime. Thermal noise within radarInBandBW+cell noise figure+ulSinrTargetModActInrMargin. Criteria-B: The estimated interference on radar (within radarInBandBW), from all WTRUs associated with the "radar illuminated" cells (ueTotalPowerOnRadar), exceeds the following threshold for a consecutive period of ulSinrTargetModActTime. Thermal noise within radarInBandBW+radarInrTarget. If the triggering criteria for PUSCH/PUCCH/SRS SINR target adjustment for any given cell are met, the gNB determines the modified SINR target for PUSCH/PUCCH/SRS power control as follows: Modified PUSCH/PUCCH/SRS SINR target=Nominal PUSCH/PUCCH/SRS SINR target+ulSinrTargetOffset. When the triggering criteria-A for PUSCH/PUCCH/SRS SINR target adjustment are met, the gNB selects the criteria-A PUSCH/PUCCH/SRS SINR target adjustment eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold ulSinrTargetModLowAzOffsetA. The offset between the azimuth AoA of the radar interference and the direction of the SSB/CSI-RS beam the WTRU is associated with is larger than the pre-configured threshold ulSinrTargetModHighAzOffsetA. If ulSinrTargetModLowAzOffsetA=ulSinrTargetModHighAzOffsetA, PUSCH/PCCH/SRS SINR target adjustment may be applied to all WTRUs in the cell when triggering criteria-A are met.

When the triggering criteria-B for PUSCH/PUCCH/SRS SINR target adjustment are met, the gNB selects the criteria-B PUSCH/PUCCH/SRS SINR target adjustment eligible WTRUs of the triggered cell(s), among either the connected WTRUs or scheduled WTRUs, based on the following criteria: the offset between the azimuth AoA of the radar interference and the direction of the SSB/CSI-RS beam the WTRU is associated with is smaller than or equal to the pre-configured threshold ulSinrTargetModLowAzOffsetB. The offset between the azimuth AoA of the radar interference and the direction of the SSB/CSI-RS beam the WTRU is associated with is larger than the pre-configured threshold ulSinrTargetModHighAzOffsetB. If ulSinrTargetModLowAzOffsetB=ulSinrTargetModHighAzOffsetB, PUSCH/PUCCH/SRS SINR target adjustment may be applied to all WTRUs in the cell when triggering criteria-B are met.

When the triggering criteria-A are met on a cell, the gNB applies the modified SINR target on PUSCH/PUCCH/SRS to all criteria-A eligible WTRUs on that cell. When the triggering criteria-B are met on a cell, the gNB applies the modified SINR target on PUSCH/PUCCH/SRS to all criteria-B eligible WTRUs on that cell. PUSCH/PUCCH/SRS SINR target adjustment may be disabled based on the following criteria: Criteria-A: The estimated radar interference (within radarInBandBW) on the cell (radarPowerOnCell) falls below the following threshold for a consecutive period of ulSinrTargetModDeactTime. Thermal noise within radarInBandBW+cell noise figure+ulSinrTargetModDeactInrMargin. Criteria-B: The estimated interference on radar (within radarInBandBW), from all WTRUs associated with the "radar illuminated" cells (ueTotalPowerOnRadar), falls below the following threshold for a consecutive period of ulSinrTargetModDeactTime. Thermal noise within radarInBandBW+radarInrTarget. When only criteria-A have been triggered on a cell, and the disabling criteria-A are met, gNB disables PUSCH/PUCCH/SRS SINR target adjustment on that cell. When only criteria-B have been triggered on a cell, and the disabling criteria-B are met, gNB disables PUSCH/PUCCH/SRS SINR target adjustment on that cell. When both criteria-A and criteria-B have been triggered on a cell, and only the disabling criteria-A are met, gNB disables PUSCH/PUCCH/SRS SINR target adjustment to WTRUs that are not criteria-B eligible on that cell. When both criteria-A and criteria-B have been triggered on a cell, and only the disabling criteria-B are met, gNB disables PUSCH/PUCCH/SRS SINR target adjustment to WTRUs that are not criteria-A eligible on that cell. When both criteria-A and criteria-B have been triggered on a cell, and both the disabling criteria-A and criteria-B are met, gNB disables PUSCH/PUCCH/SRS SINR target adjustment on that cell.

In embodiments, PRACH preamble received target power adjustment is used to mitigate the interference from radar to gNB and/or the interference from WTRU to radar. Triggering of PRACH received target power adjustment. PRACH received target power adjustment may be triggered based on the following criteria: Criteria-A: The estimated radar interference (within radarInBandBW) on the cell (radarPowerOnCell) exceeds the following threshold for a consecutive period of prachRxTargetPwrModActTime. Thermal noise within radarInBandBW+cell noise figure+prachRxTargetPwrModActInrMargin. Criteria-B: The estimated interference on radar (within radarInBandBW), from all WTRUs associated with the "radar illuminated" cells (ueTotalPowerOnRadar), exceeds the following threshold for a consecutive period of prachRxTargetPwrModActTime. Thermal noise within radarInBandBW+radarInrTarget.

If the triggering criteria for PRACH received target power adjustment for any given cell are met, the gNB determines the modified received target power for PRACH power control as follows: Modified PRACH received target power=Nominal PRACH received target power+prachRxTargetPwrOffset. When the triggering criteria-A for PRACH received target power adjustment are met, gNB selects the criteria-A PRACH received target power adjustment eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold prachRxTargetPwrModLowAzOffsetA. The offset between the azimuth AoA of the radar interference and the direction of the SSB/CSI-RS beam the WTRU is associated with is larger than the pre-configured threshold prachRxTargetPwrModHighAzOffsetA.

If prachRxTargetPwrModLowAzOffsetA= prachRxTargetPwrModHighAzOffsetA, PRACH preamble received target power adjustment may be applied to all WTRUs in the cell when triggering criteria-A are met. When the triggering criteria-B for PRACH received target power adjustment are met, the gNB selects the criteria-B PRACH received target power adjustment eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is smaller than or equal to the pre-configured threshold prachRxTargetPwrModLowAzOffsetB. The offset between the azimuth AoA of the radar interference and the direction of the SSB/CSI-RS beam the is associated with is larger than the pre-configured threshold prachRxTargetPwrModHighAzOffsetB. If prachRxTargetPwrModLowAzOffsetB= prachRxTargetPwrModHighAzOffsetB, PRACH preamble received target power adjustment may be applied to all WTRUs in the cell when triggering criteria-B are met. When the triggering criteria-A are met on a cell, gNB applies the modified preamble received target power on PRACH to all criteria-A eligible WTRUs on that cell. When the triggering criteria-B are met on a cell, the gNB applies the modified preamble received target power on PRACH to all criteria-B eligible WTRUs on that cell.

In embodiments, PRACH received target power adjustment is disabled based on the following criteria: Criteria-A: The estimated radar interference (within radarInBandBW) on the cell (radarPowerOnCell) falls below the following threshold fora consecutive period of prachRxTargetPwrModDeactTime. Thermal noise within radarInBandBW+cell noise figure+prachRxTargetPwrModDeactInrMargin. Criteria-B: The estimated interference on radar (within radarInBandBW), from all WTRUs associated with the "radar illuminated" cells (ueTotalPowerOnRadar), falls below the following threshold for a consecutive period of prachRxTargetPwrModDeactTime. Thermal noise within radarInBandBW+radarInrTarget. When only criteria-A have been triggered on a cell, and the disabling criteria-A are met, the gNB disables PRACH preamble received target power adjustment on that cell. When only criteria-B have been triggered on a cell, and the disabling criteria-B are met, the gNB disables PRACH preamble received target power adjustment on that cell. When both criteria-A and criteria-B have been triggered on a cell, and only the disabling criteria-A are met, gNB disables PRACH preamble received target power adjustment to WTRUs that are not criteria-B eligible on that cell. When both criteria-A and criteria-B have been triggered on a cell, and only the disabling criteria-B are met, the gNB disables PRACH preamble received target power adjustment to WTRUs that are not criteria-A eligible on that cell. When both criteria-A and criteria-B have been triggered on a cell, and both the disabling criteria-A and criteria-B are met, the gNB disables PRACH preamble received target power adjustment on that cell.

In embodiments, PUSCH/SRS fractional power control adjustment (with fractional power control scaling factor alpha<1) is used to mitigate the interference from radar to the gNB and/or the interference from WTRU to radar. Note: Separate configurable parameters can be defined for PUSCH and SRS to allow individual control of different channels.

In embodiments PUSCH/SRS fractional power control adjustment is triggered based on the following criteria: Criteria-A: The estimated radar interference (within radarInBandBW) on the cell (radarPowerOnCell) exceeds the following threshold for a consecutive period of ulFractionalPcActTime. Thermal noise within radarInBandBW+cell noise figure+ulFractionalPcActInrMargin. Criteria-B: The estimated interference on radar (within radarInBandBW), from all WTRUs associated with the "radar illuminated" cells (ueTotalPowerOnRadar), exceeds the following threshold for a consecutive period of ulFractionalPcActTime. Thermal noise within radarInBandBW+radarInrTarget. If the triggering criteria for PUSCH/SRS fractional power control adjustment for any given cell are met, the gNB determines the modified power control parameters for PUSCH/SRS on that cell as follows: P0=ulFpcP0; alpha=ulFpcAlpha.

When the triggering criteria-A for PUSCH/SRS fractional power control adjustment are met, the gNB selects the criteria-A PUSCH/SRS fractional power control adjustment eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is larger than or equal to the pre-configured threshold ulFractionalPcModMinAzOffsetA. The offset between the azimuth AoA of the radar interference and the direction of the SSB/CSI-RS beam the WTRU is associated with is smaller than the pre-configured threshold ulFractionalPcMaxAzOffsetA. If ulFractionalPcModMinAzOffsetA= ulFractionalPcMaxAzOffsetA, PUSCH/SRS fractional power control adjustment may be applied to all WTRUs in the cell when triggering criteria-A are met.

When the triggering criteria-B for PUSCH/SRS fractional power control adjustment are met, the gNB selects the criteria-B PUSCH/SRS fractional power control adjustment eligible WTRUs of the triggered cell(s), among either the connected WTRUs or scheduled WTRUs, based on the following criteria: The offset between the azimuth AoA of the radar interference and the direction of the SSB/CSI-RS beam the WTRU is associated with is larger than or equal to the pre-configured threshold ulFractionalPcMinAzOffsetB. The offset between the azimuth AoA of the radar interference and the direction of the SSB/CSI-RS beam the WTRU is associated with is smaller than the pre-configured threshold ulFractionalPcMaxAzOffsetB. If ulFractionalPcLowAzOffsetB=ulFractional PcHighAzOffsetB, PUSCH/SRS fractional power control adjustment may be applied to all WTRUs in the cell when triggering criteria-B are met. When the triggering criteria-A are met on a cell, the gNB applies the modified power control parameters P0 and alpha on PUSCH/SRS to all criteria-A eligible WTRUs on that cell. When the triggering criteria-B are met on a cell, the gNB applies the modified power control parameters P0 and alpha on PUSCH/SRS to all criteria-B eligible WTRUs on that cell.

In embodiments PUSCH/SRS fractional power control adjustment is disabled based on the following criteria: Criteria-A: The estimated radar interference (within radarInBandBW) on the cell (radarPowerOnCell) falls below the following threshold for a consecutive period of ulFractionalPcModDeactTime. Thermal noise within radarInBandBW+cell noise figure+ulFractionalPcDeactInrMargin. Criteria-B: The estimated interference on radar (within radarInBandBW), from all WTRUs associated with the "radar illuminated" cells (ueTotalPowerOnRadar), falls below the following threshold for a consecutive period of ulFractionalPcDeactTime. Thermal noise within radarInBandBW+radarInrTarget. When only criteria-A have been triggered on a cell, and the disabling criteria-A are met, the gNB reverts to the nominal PUSCH/SRS power control parameters on that cell. When only criteria-B have been triggered on a cell, and the disabling criteria-B are met, the gNB reverts to the nominal PUSCH/SRS power control parameters on that cell. When both criteria-A and criteria-B have been triggered on a cell, and only the disabling criteria-A are met, the gNB reverts to the nominal PUSCH/SRS power control parameters to WTRUs that are not criteria-B eligible on that cell. When both criteria-A and criteria-B have been triggered on a cell, and only the disabling criteria-B are met, the gNB reverts to the nominal PUSCH/SRS power control parameters to WTRUs that are not criteria-A eligible on that cell. When both criteria-A and criteria-B have been triggered on a cell, and both the disabling criteria-A and criteria-B are met, the gNB reverts to the nominal PUSCH/SRS power control parameters on that cell.

In embodiments, cell transmit power adjustment is used to mitigate the interference from gNB to radar. Triggering of Cell Tx power adjustment. Cell Tx power adjustment may be triggered based on the following criteria: The estimated radar interference (within radarInBandBW) on the cell (radarPowerOnCell) exceeds the following threshold for a consecutive period of cellTxPowerModActTime. Thermal noise within radarInBandBW+cell noise figure+cellTxPowerModActInrMargin OR The estimated interference on radar (within radarInBandBW), from all WTRUs associated with the "radar illuminated" cells (ueTotalPowerOnRadar), exceeds the following threshold for a consecutive period of cellTxPowerModActTime. Thermal noise within radarInBandBW+radarInrTarget If the triggering criteria for PUSCH cell Tx power adjustment for any given cell are met, the gNB modifies the Tx power level of that cell as follows: Modified Cell Tx power=Nominal Cell Tx power+cellTxPowerOffset. When the triggering criteria for cell Tx power adjustment are met on a cell, the gNB gradually (cellTxPowerModStep dB at a time) reduce cell Tx power to the modified power level on that cell (while requesting the gNB to send out system information (SI) update for SS_PBCH absolute power changes for this cell every cellTxPowerModForSIUpdate dB power adjustment).

Cell Tx power adjustment may be disabled based on the following criteria: The estimated radar interference (within radarInBandBW) on the cell (radarPowerOnCell) falls below the following threshold for a consecutive period of cellTxPowerModDeactTime. Thermal noise within radarInBandBW+cell noise figure+cellTxPowerModDeactInrMargin AND The estimated interference on radar (within radarInBandBW), from all WTRUs associated with the "radar illuminated" cells (ueTotalPowerOnRadar), falls below the following threshold for a consecutive period of cellTxPowerModDeactTime. Thermal noise within radarInBandBW+radarInrTarget.

When the disabling criteria for cell Tx power adjustment are met on a cell, the gNB gradually (cellTxPowerModStep dB at a time) reverts to the nominal cell Tx power level on that cell (while requesting the gNB to send out system information (SI) update for SS_PBCH absolute power changes for this cell every cellTxPowerModForSIUpdate dB power adjustment).

In embodiments, SSB/CORESET 0 relocation is essential for mitigating the interference from radar to WTRU and/or the interference from gNB to radar when the radar bandwidth overlaps with the PRBs used for SSB/CORESET 0.

In embodiments, SSB/CORESET 0 relocation is triggered based on the following criteria, if any SSB/CORESET 0 PRBs falls in the radarInBandBW±ssbRecolcationPrbMargin: The estimated radar interference (within radarInBandBW) on the WTRU (radarPowerOnUe) exceeds the following threshold for a consecutive period of ssbRelocationActTime. Thermal noise within radarInBandBW+WTRU noise figure+ssbRelocationActInrMargin AND The estimated interference on radar (within radarInBandBW), from all "radar illuminated" cells (gNBTotalPowerOnRadar), exceeds the following threshold for a consecutive period of ssbRelocationActTime. Thermal noise within radarInBandBW+radarInrTarget. When the triggering criteria for SSB/CORESET 0 relocation are met on a cell, gNB relocates the SSB/CORESET 0 PRB location of that cell.

In embodiments SSB/CORESET 0 relocation is disabled based on the following criteria: The estimated radar interference (within radarInBandBW) on the WTRU (radarPowerOnUe) falls below the following threshold for a consecutive period of ssbRelocationDeactTime. Thermal noise within radarInBandBW+WTRU noise figure+ssbRelocationDeactInrMargin OR The estimated interference on radar (within radarInBandBW), from all "radar illuminated" cells (gNBTotalPowerOnRadar), falls below the following threshold fora consecutive period of ssbRelocationDeactTime. Thermal noise within radarInBandBW+radarInrTarget.

When the disabling criteria for SSB/CORESET 0 Relocation are met on a cell, the gNB reverts to the nominal SSB/CORESET 0 PRB location on that cell. When ssbRelocationDeactTime is set to 0, the SSB/CORESET 0 configuration may not be reverted, irrespective of the disabling criteria.

In embodiments PRACH relocation is essential for mitigating the interference from radar to the gNB and/or from WTRU to radar when the radar bandwidth overlaps with the PRBs used for PRACH. PRACH relocation may be triggered based on the following criteria if any PRACH PRBs falls in the radarInBandBW±prachRecolcationPrbMargin: The estimated radar interference (within radarInBandBW) on the cell (radarPowerOnCell) exceeds the following threshold for a consecutive period of prachRelocationActTime. Thermal noise within radarInBandBW+cell noise figure+prachRelocationActInrMargin OR The estimated interference on radar (within radarInBandBW), from all WTRUs associated with the "radar illuminated" cells (ueTotalPowerOnRadar), exceeds the following threshold for a consecutive period of prachRelocationActTime. Thermal noise within radarInBandBW+radarInrTarget. When the triggering criteria for PRACH relocation are met on a cell, the gNB relocates the PRACH PRB location of that cell.

In embodiments PRACH relocation is disabled based on the following criteria: The estimated radar interference (within radarInBandBW) on the cell (radarPowerOnCell) falls below the following threshold for a consecutive period of prachRelocationDeactTime. Thermal noise within radarInBandBW+cell noise figure+prachRelocationDeactInrMargin AND The estimated interference on radar (within radarInBandBW), from all WTRUs associated with the "radar illuminated" cells (ueTotalPowerOnRadar), falls below the following threshold for a consecutive period of prachRelocationDeactTime. Thermal noise within radarInBandBW+radarInrTarget. When the disabling criteria for PRACH Relocation are met on a cell, the gNB reverts to the nominal PRACH PRB location on that cell. When prachRelocationDeactTime is set to 0, the PRACH configuration may not be reverted, irrespective of the disabling criteria. PUCCH reconfiguration can be used to mitigate the interference from radar to the gNB and/or the interference from WTRU to radar.

In embodiments, PUCCH reconfiguration is triggered based on the following criteria: The estimated radar interference (within radarInBandBW) on the cell (radarPowerOnCell) exceeds the following threshold for a consecutive period of pucchReconfigActTime. Thermal noise within radarInBandBW+cell noise figure+pucchReconfigActInrMargin OR The estimated interference on radar (within radarInBandBW), from all WTRUs associated with the "radar illuminated" cells (ueTotalPowerOnRadar), exceeds the following threshold for a consecutive period of pucchPrbBlankingActTime. Thermal noise within radarInBandBW+radarInrTarget. When the triggering criteria for PUCCH reconfiguration are met on a cell, gNB reconfigures the PUCCH Resources/ResourceSets to avoid the PRBs affected by radar on that cell.

In embodiments, PUCCH reconfiguration is disabled based on the following criteria: The estimated radar interference (within radarInBandBW) on the cell (radarPowerOnCell) falls below the following threshold for a consecutive period of pucchReconfigDeactTime. Thermal noise within radarInBandBW+cell noise figure+pucchReconfigDeactInrMargin AND The estimated interference on radar (within radarInBandBW), from all WTRUs associated with the "radar illuminated" cells (ueTotalPowerOnRadar), falls below the following threshold for a consecutive period of pucchReconfigDeactTime. Thermal noise within radarInBandBW+radarInrTarget. When the disabling criteria for PUCCH Reconfiguration are met on a cell, is gNB reverts to the nominal PUCCH configuration on that cell. When pucchReconfigDeactTime is set to 0, the PUCCH configuration may not be reverted, irrespective of the disabling criteria.

In embodiments, SRS reconfiguration is used to mitigate the interference from radar to the gNB and/or the interference from WTRU to radar when the radar bandwidth overlaps with the PRBs used for SRS.

In embodiments SRS reconfiguration is triggered based on the following criteria, if any SRS PRBs falls in the radarInBandBW±srsReconfigPrbMargin: The estimated radar interference (within radarInBandBW) on the cell (radarPowerOnCell) exceeds the following threshold for a consecutive period of srsReconfigActTime. Thermal noise within radarInBandBW+cell noise figure+srsReconfigActInrMargin OR The estimated interference on radar (within radarInBandBW), from all WTRUs associated with the "radar illuminated" cells (ueTotalPowerOnRadar), exceeds the following threshold for a consecutive period of srsReconfigActTime. Thermal noise within radarInBandBW+radarInrTarget. When the triggering criteria for SRS reconfiguration are met on a cell, the gNB reconfigures the SRS PRB location (and/or timing) of that cell.

In embodiments SRS reconfiguration is disabled based on the following criteria: The estimated radar interference (within radarInBandBW) on the cell (radarPowerOnCell) falls below the following threshold for a consecutive period of srsReconfigDeactTime. Thermal noise within radarInBandBW+cell noise figure+srsReconfigDeactInrMargin AND The estimated interference on radar (within radarInBandBW), from all WTRUs associated with the "radar illuminated" cells (ueTotalPowerOnRadar), falls below the following threshold for a consecutive period of srsReconfigDeactTime. Thermal noise within radarInBandBW+radarInrTarget. When the disabling criteria for SRS reconfiguration are met on a cell, gNB reverts to the nominal SRS configuration (frequency and timing) on that cell. When srsReconfigDeactTime is set to 0, the SRS configuration may not be reverted, irrespective of the disabling criteria.

In embodiments paging reconfiguration is used to mitigate the interference from radar to WTRU and/or the interference from gNB to radar. Paging reconfiguration may be triggered based on the following criteria: The estimated radar interference (within radarInBandBW) on the WTRU (radarPowerOnUe) exceeds the following threshold for a consecutive period of pagingReconfigActTime. Thermal noise within radarInBandBW+WTRU noise figure+pagingReconfigActInrMargin OR The estimated interference on radar (within radarInBandBW), from all "radar illuminated" cells (gNBTotalPowerOnRadar), exceeds the following threshold for a consecutive period of pagingReconfigActTime. Thermal noise within radarInBandBW+radarInrTarget. When the triggering criteria for Paging reconfiguration are met on a cell, gNB applies Paging reconfiguration that cell.

In embodiments, paging reconfiguration is disabled based on the following criteria: The estimated radar interference (within radarInBandBW) on the WTRU (radarPowerOnUe) falls below the following threshold for a consecutive period of pagingReconfigDeactTime. Thermal noise within radarInBandBW+WTRU noise figure+pagingReconfigDeactInrMargin AND The estimated interference on radar (within radarInBandBW), from all "radar illuminated" cells (gNBTotalPowerOnRadar), falls below the following threshold fora consecutive period of pagingReconfigDeactTime. Thermal noise within radarInBandBW+radarInrTarget. When the disabling criteria for Paging reconfiguration are met on a cell, gNB reverts to the nominal paging configuration on that cell. When pagingReconfigDeactTime is set to 0, the Paging reconfiguration may not be reverted, irrespective of the disabling criteria.

In embodiments, PDCCH reconfiguration is used to mitigate the interference from radar to WTRU and/or the interference from the gNB to radar. PDCCH reconfiguration may be triggered based on the following criteria: The estimated radar interference (within radarInBandBW) on the WTRU (radarPowerOnUe) exceeds the following threshold for a consecutive period of pdcchReconfigActTime. Thermal noise within radarInBandBW+WTRU noise figure+pdcchReconfigActInrMargin OR The estimated interference on radar (within radarInBandBW), from all "radar illuminated" cells (gNBTotalPowerOnRadar), exceeds the following threshold for a consecutive period of pdcchReconfigActTime. Thermal noise within radarInBandBW+radarInrTarget. When the triggering criteria for PDCCH reconfiguration are met on a cell, gNB applies the PDCCH reconfiguration on that cell.

In embodiments, PDCCH reconfiguration is disabled based on the following criteria. The estimated radar interference (within radarInBandBW) on the WTRU (radarPowerOnUe) falls below the following threshold for a consecutive period of pdcchReconfigDeactTime. Thermal noise within radarInBandBW+WTRU noise figure+pdcchReconfigDeactInrMargin AND The estimated interference on radar (within radarInBandBW), from all "radar illuminated" cells (gNBTotalPowerOnRadar), falls below the following threshold for a consecutive period of pdcchReconfigDeactTime. Thermal noise within radarInBandBW+radarInrTarget. When the disabling criteria for PDCCH reconfiguration are met on a cell, the gNB reverts to the nominal PDCCH configuration on that cell. When pdcchReconfigDeactTime is set to 0, the PDCCH reconfiguration may not be reverted, irrespective of the disabling criteria.

In embodiments, a gNB may be configured to perform any or all of: estimation of radar interference on gNB; estimation of gNB interference on radar; estimation of radar interference on WTRU; estimation of WTRU interference on radar; and estimation of angle of arrival from WTRU.

In embodiments, an estimation of radar interference on the gNB is made. In the case of fully digital beamforming: estimate the received radar power spectral density (PSD) based on the IQ samples per antenna element; average the received radar PSD over all antenna elements of a cell; estimate radar bandwidth based on the measured radar PSD; calculate the average element received radar total interference power for each cell by summing up (in the linear domain) the radar PSD over radar bandwidth; estimate radar in-band bandwidth (radar bandwidth that overlaps with the 5G carrier bandwidth of the cell) based on the measured radar PSD; calculate the average element received radar in-band interference power for each cell by summing up (in the linear domain) the radar PSD over radar in-band bandwidth.

In the case of hybrid beamforming: estimate the received radar power spectral density (PSD) based on the IQ samples per analog beam; average the received radar PSD over all analog beams of a cell; estimate radar bandwidth based on the measured radar PSD; calculate the average analog beam received radar total interference power for each cell by summing up (in the linear domain) the radar PSD over radar bandwidth; estimate radar in-band bandwidth (radar bandwidth that overlaps with the 5G carrier bandwidth of the cell) based on the measured radar PSD; calculate the average analog beam received radar in-band interference power for each cell by summing up (in the linear domain) the radar PSD over radar in-band bandwidth.

In embodiments, an estimation of gNB interference on radar is made. In the case of fully digital beamforming: estimate pathloss from radar to the cell (dB) as the assumed radar Tx power (dBm) minus the average element received radar total interference power (dBm); estimate per-cell interference power on radar as the sum of cell Tx transmit power (dBm), estimated pathloss from radar to the cell (dB), maximum beamforming gain (dB) based on the num of elements per cell (worst case assumption), and the ratio of radar in-band bandwidth and cell carder bandwidth in dB; estimate per-gNB interference power on radar by summing up (in the linear domain) the per-cell interference power on radar over all cells within the gNB; send the estimated per-gNB interference power on radar to other gNBs via inter-gNB communication (or to a centralized entity and relay back the information sent from other gNBs); estimate the aggregate gNB interference power on radar by summing up (in the linear domain) the per-gNB interference power from its own estimated interference power and the estimated interference powers from all other reported gNBs.

In the case of hybrid beamforming: estimate pathloss from radar to the cell (dB) as the assumed radar Tx power (dBm) minus the average analog beam received radar total interference power (dBm); estimate per-cell interference power on radar as the sum of cell Tx transmit power (dBm), estimated pathloss from radar to the cell (dB), maximum digital beamforming gain (dB) based on the num of analog beams per cell (worst case assumption), and the ratio of radar in-band bandwidth and cell carrier bandwidth in dB; estimate per-gNB interference power on radar by summing up (in the linear domain) the per-cell interference power on radar over all cells within the gNB; send the estimated per-gNB interference power on radar to other gNBs via inter-gNB communication (or to a centralized entity and relay back the information sent from other gNBs); estimate the aggregate gNB interference power on radar by summing up (in the linear domain) the per-gNB interference power from its own estimated interference power and the estimated interference powers from all other reported gNBs.

In embodiments an estimation of radar interference on a WTRU is made. In the case of fully digital beamforming: estimate radar interference power on a virtual omni-WTRU by averaging (in the linear domain) over some or all cells in a gNB (nominally including the radar facing cell) the average element received radar in-band interference power of a cell minus the element antenna gain in the radar AoA direction of the same cell.

In the case of hybrid beamforming: estimate radar interference power on a virtual omni-WTRU by averaging (in the linear domain) over some or all cells in a gNB (nominally including the radar facing cell) the average analog beam received radar in-band interference power of a cell minus the analog beam gain in the radar AoA direction of the same cell.

In embodiments, an estimation of WTRU interference on radar is made: by some of all of the following actions: 1) estimate pathloss (dB) from radar to a virtual WTRU as the estimated radar interference power on the virtual WTRU (dBm) minus the assumed radar Tx power (dBm); 2) estimate per-WTRU interference power on radar as the sum of WTRU maximum Tx power (dBm), estimated pathloss from radar to the WTRU (dB), and the ratio of radar in-band bandwidth and cell carrier bandwidth the WTRU is associated with in dB; 3) estimate the per-cell aggregate WTRU interference power on radar by multiplying (in the linear domain) the per-WTRU interference power on radar with the average number of scheduled WTRUs per slot within a cell, wherein if the average number of scheduled WTRUs per slot per cell information is not available, a configurable parameter can be used instead; 4) estimate the per-gNB aggregate WTRU interference power on radar by summing up (in the linear domain) the per-cell aggregate WTRU interference power on radar over all cells within the gNB; 5) send the estimated per-gNB WTRU interference power on radar to other gNBs via inter-gNB communication (or to a centralized entity and relay back the information sent from other gNBs); 6) estimate the total aggregate WTRU interference power on radar by summing up (in the linear domain) the per-gNB interference power from its own estimated interference power and the estimated WTRU interference powers from all other reported gNBs.

In embodiments, estimation of angle of arrival (AoA) from a WTRU is made including some or all of the following actions: Estimate the WTRU AoA via downlink reference signals such as SSB, CSI-RS or PRS based on the WTRU reported RSRP measurements on the corresponding beams. The direction associated with the strongest beam is identified as the WTRU AoA. In the case of digital beamforming or hybrid beamforming, further fine tune the UE AoA by measuring the AoA of the SRS, PUCCH or PUSCH/DMRS using digital signaling processing techniques such as MVDR or MUSIC.

In embodiments a gNB is configured to execute the instructions of: compare the estimated radar interference on gNB with a pre-determined power threshold to trigger/disable enhancements to mitigate the impact of radar interference on gNB; compare the AoA offset between radar interference and WTRU (relative to the serving cell) with a set of pre-determined angular thresholds to select all or specific WTRUs to apply the corresponding enhancements to mitigate the impact of radar interference on gNB; compare the estimated aggregate gNB interference on radar with a pre-determined power threshold to trigger/disable enhancements to mitigate the impact of gNB interference on radar; compare the AoA offset between radar interference and WTRU (relative to the serving cell) with a set of pre-determined angular thresholds to select all or specific WTRUs to apply the corresponding enhancements to mitigate the impact of gNB interference on radar; compare the estimated radar interference on WTRU with a pre-determined power threshold to trigger/disable enhancements to mitigate the impact of radar interference on WTRU; compare the AoA offset between radar interference and WTRU (relative to the serving cell) with a set of pre-determined angular thresholds to select all or specific WTRUs to apply the corresponding enhancements to mitigate the impact of radar interference on WTRU; compare the estimated aggregate WTRU interference on radar with a pre-determined threshold to trigger enhancements to mitigate the impact of WTRU interference on radar; compare the AoA offset between radar interference and WTRU (relative to the serving cell) with a set of pre-determined angular thresholds to select all or specific WTRUs to apply the corresponding enhancements to mitigate the impact of WTRU interference on radar.

In embodiments, gNB uplink beam nulling is triggered to mitigate radar interference on a cell. The estimated radar interference on a cell exceeds the sum of thermal noise within the estimated radar sweep bandwidth, noise figure of the cell, and a configurable uplink beam nulling cell-INR margin for a configurable consecutive period. Uplink beam nulling eligible WTRU selection to mitigate radar interference on a cell. The offset between the AoA of the radar interference and the direction of the SSB/CSI-RS beam the WTRU is associated with is larger than or equal to a pre-configured angular threshold for uplink beam nulling. The offset between the AoA of the radar interference and the direction of the SSB/CSI-RS beam the WTRU is associated with is smaller than a second pre-configured angular threshold for uplink beam nulling.

In embodiments, gNB uplink beam nulling is disabled. The estimated radar interference on a cell falls below the sum of thermal noise within the estimated radar sweep bandwidth, noise figure of the cell, and a second configurable uplink beam nulling cell-INR margin for a second configurable consecutive period.

In embodiments, gNB downlink beam nulling is triggered to mitigate gNB interference on radar. The estimated aggregate gNB interference on radar exceeds the sum of thermal noise within the estimated radar sweep bandwidth and a configurable downlink beam nulling radar-INR margin for a configurable consecutive period, respectively.

In embodiments, gNB downlink beam nulling is performed on an eligible WTRU selection to mitigate gNB interference on radar. The offset between the AoA of the radar interference and the direction of the SSB/CSI-RS beam the WTRU is associated with is larger than or equal to a pre-configured angular threshold for downlink beam nulling, respectively. The offset between the AoA of the radar interference and the direction of the SSB/CSI-RS beam the WTRU is associated with is smaller than a second pre-configured angular threshold for downlink beam nulling, respectively.

In embodiments disabling of downlink beam nulling is performed when the estimated aggregate gNB interference on radar falls below the sum of thermal noise within the estimated radar sweep bandwidth and a second configurable downlink beam nulling radar-INR margin for a second configurable consecutive period, respectively.

In embodiments, triggering of WTRU uplink beam nulling to mitigate WTRU interference on radar is made based on some or all of the following: In the case where estimated aggregate WTRU interference on radar exceeds the sum of thermal noise within the estimated radar sweep bandwidth and a configurable uplink beam nulling radar-INR margin for a configurable consecutive period, respectively. A gNB sends a beam nulling activation command to the WTRU, along with the beam nulling angle, beam nulling angle offset threshold and interfering PRB information, to enable WTRU uplink beam nulling. The change of interference information (e.g., AoA) will also trigger an updated activation command. Upon receiving the uplink beam nulling activation command from gNB, and if the azimuth angle offset (absolute value) between the beam nulling angle and the WTRU uplink communication angle is larger than the beam nulling angle offset threshold, in embodiments, the WTRU: applies uplink beam nulling on “nonCodebook” SRS resources if the SRS resources overlap with the interfering PRBs. In an embodiment, the WTRU further applies the same precoding weight that is used for the transmission of “nonCodebook” SRS resources to transmit PUSCH/DMRS. In an alternative embodiment, the WTRU further applies the same precoding weight that is used for the transmission of “nonCodebook” SRS resources to transmit PUSCH/DMRS only if the scheduled PUSCH resources overlap with the indicated interfering PRBs. In embodiments, the WTRU applies uplink beam nulling on PUCCH/DMRS transmissions if the scheduled PUCCH resources overlap with the indicated interfering PRBs.

In embodiments, WTRU uplink beam nulling is disabled based on some or all of the following criteria and actions: In a case where the estimated aggregate WTRU interference on radar falls below the sum of thermal noise within the estimated radar sweep bandwidth and a second configurable downlink beam nulling radar-INR margin for a second configurable consecutive period, respectively, the gNB sends beam nulling deactivation command to the WTRU to disable WTRU uplink beam nulling. Upon receiving the uplink beam nulling deactivation command from gNB, the WTRU disables the uplink beam nulling when transmitting SRS, PUSCH/DMRS, and PUCCH/DMRS.

In embodiments triggering of WTRU downlink beam nulling to mitigate radar interference on WTRUs is performed based on some or all of the following criteria and actions: In a case where estimated radar interference on a WTRU exceeds the sum of thermal noise within the estimated radar sweep bandwidth, noise figure of the WTRU, and a configurable WTRU downlink beam nulling WTRU-INR margin for a configurable consecutive period, a gNB sends a beam nulling activation command to UE, along with the beam nulling angle, beam nulling angle offset threshold and interfering PRB information, to enable UE downlink beam nulling. In embodiments, the change of interference information (e.g., AoA) will also trigger an updated activation command. Upon receiving the downlink beam nulling activation command from gNB, and if the azimuth angle offset (absolute value) between the beam nulling angle and the WTRU downlink communication angle is larger than the beam nulling angle offset threshold, the WTRU applies downlink beam nulling on CSI-RS receptions if the CSI-RS resources overlap with the indicated interfering PRB. In an embodiment, the WTRU further applies the same spatial filter that is used for the reception of CSI-RS for the reception of PDSCH/DMRS. In an alternative embodiment, the WTRU further applies the same spatial filter that is used for the reception of CSI-RS for the reception of PDSCH/DMRS only if the scheduled PDSCH resources overlap with the indicated interfering PRBs. In further embodiments downlink beam nulling on PDCCH/DMRS receptions is applied if the PDCCH resources overlap with the indicated interfering PRBs.

In embodiments, WTRU downlink beam nulling is disabled based on some or all of the following criteria and actions: When the estimated radar interference on a WTRU falls below the sum of thermal noise within the estimated radar sweep bandwidth, noise figure of the WTRU, and a second configurable uplink beam nulling WTRU-INR margin for a second configurable consecutive period. The gNB then sends a beam nulling deactivation command to the WTRU to disable WTR downlink beam nulling. Upon receiving the beam nulling deactivation command from the gNB, the WTRU disables beam nulling in the reception of CSI-RS, PDSCH/DMRS, and PDCCH/DMRS.

In embodiments, triggering of PUSCH PRB blanking is performed to mitigate radar interference on a cell. The estimated radar interference on a cell exceeds the sum of thermal noise within the estimated radar sweep bandwidth, noise figure of the cell, and a configurable PUSCH PRB blanking cell-INR margin for a configurable consecutive period.

In embodiments, PUSCH PRB blanking of an eligible WTRU selection is performed to mitigate radar interference on a cell. The offset between the AoA of the radar interference and the direction of the SSB/CSI-RS beam the WTRU is associated with is smaller than or equal to a pre-configured angular threshold for PUSCH PRB blanking. The offset between the AoA of the radar interference and the direction of the SSB/CSI-RS beam the WTRU is associated with is larger than a second pre-configured angular threshold for PUSCH PRB blanking.

In embodiments, triggering of PUSCH PRB blanking is performed to mitigate WTRU interference on radar. The estimated aggregate WTRU interference on radar exceeds the sum of thermal noise within the estimated radar sweep bandwidth and a configurable PUSCH PRB blanking radar-INR margin for a configurable consecutive period.

In embodiments, PUSCH PRB blanking of an eligible WTRU selection is performed to mitigate WTRU interference on radar. The offset between the AoA of the radar interference and the direction of the SSB/CSI-RS beam the WTRU is associated with is smaller than or equal to a third pre-configured angular threshold for PUSCH PRB blanking. The offset between the AoA of the radar interference and the direction of the SSB/CSI-RS beam the WTRU is associated with is larger than a fourth pre-configured angular threshold for PUSCH PRB blanking.

In embodiments, disabling of PUSCH PRB blanking is performed when the estimated radar interference on a cell falls below the sum of thermal noise within the estimated radar sweep bandwidth, noise figure of the cell, and a second configurable PUSCH PRB blanking cell-INR margin for a second configurable consecutive period. The estimated aggregate WTRU interference on radar exceeds the sum of thermal noise within the estimated radar sweep bandwidth and a second configurable PUSCH PRB blanking radar-INR margin for a second configurable consecutive period.

In embodiments, triggering of PDSCH PRB blanking is used to mitigate radar interference on the WTRU, when the estimated radar interference on the WTRU exceeds the sum of thermal noise within the estimated radar sweep bandwidth, noise figure of the WTRU, and a configurable PDSCH PRB blanking WTRU-INR margin for a configurable consecutive period.

In embodiments, PDSCH PRB blanking of an eligible WTRU selection is used to mitigate radar interference on the WTRU, when the offset between the AoA of the radar interference and the direction of the SSB/CSI-RS beam the WTRU is associated with is smaller than or equal to a pre-configured angular threshold for PDSCH PRB blanking. The offset between the AoA of the radar interference and the direction of the SSB/CSI-RS beam the WTRU is associated with is larger than a second pre-configured angular threshold for PDSCH PRB blanking.

In embodiments, triggering of PDSCH PRB blanking is performed to mitigate gNB interference on radar when the estimated aggregate gNB interference on radar exceeds the sum of thermal noise within the estimated radar sweep bandwidth and a configurable PDSCH PRB blanking radar-INR margin for a configurable consecutive period.

In embodiments, PDSCH PRB blanking of an eligible WTRU selection is performed to mitigate gNB interference on radar when the offset between the AoA of the radar interference and the direction of the SSB/CSI-RS beam the WTRU is associated with is smaller than or equal to a third pre-configured angular threshold for PDSCH PRB blanking. The offset between the AoA of the radar interference and the direction of the SSB/CSI-RS beam the WTRU is associated with is larger than a fourth pre-configured angular threshold for PDSCH PRB blanking.

In embodiments, disabling of PDSCH PRB blanking is performed when the estimated radar interference on the WTRU falls below the sum of thermal noise within the estimated radar sweep bandwidth, noise figure of the WTRU, and a second configurable PDSCH PRB blanking WTRU-INR margin for a second configurable consecutive period. The estimated aggregate gNB interference on radar falls below the sum of thermal noise within the estimated radar sweep bandwidth and a second configurable PDSCH PRB blanking radar-INR margin for a second configurable consecutive period.

In embodiments, uplink squelching is triggered to mitigate radar interference on a cell is preformed when the estimated radar interference on a cell exceeds the sum of thermal noise within the estimated radar sweep bandwidth, noise figure of the cell, and a configurable uplink squelching cell-INR margin for a configurable consecutive period.

In embodiments, uplink squelching of an eligible WTRU selection is performed to mitigate radar interference on a cell when the offset between the AoA of the radar interference and the direction of the SSB/CSI-RS beam the WTRU is associated with is smaller than or equal to a pre-configured angular threshold for uplink squelching. The offset between the AoA of the radar interference and the direction of the SSB/CSI-RS beam the WTRU is associated with is larger than a second pre-configured angular threshold for uplink squelching.

In embodiments, disabling of uplink squelching is performed when the estimated radar interference on a cell falls below the sum of thermal noise within the estimated radar sweep bandwidth, noise figure of the cell, and a second configurable uplink squelching cell-INR margin fora second configurable consecutive period.

In embodiments, triggering of a downlink resource reservation is performed to mitigate radar interference on the WTRU when the estimated radar interference on the WTRU exceeds the sum of thermal noise within the estimated radar sweep bandwidth, noise figure of the WTRU, and a configurable downlink resource reservation WTRU-INR margin for a configurable consecutive period.

In embodiments, downlink resource reservation eligible WTRU selection to mitigate radar interference on the WTRU is performed when the offset between the AoA of the radar interference and the direction of the SSB/CSI-RS beam the WTRU is associated with is smaller than or equal to a pre-configured angular threshold for downlink resource reservation. The offset between the AoA of the radar interference and the direction of the SSB/CSI-RS beam the WTRU is associated with is larger than a second pre-configured angular threshold for downlink resource reservation.

In embodiments, disabling of downlink resource reservation is performed when the estimated radar interference on the WTRU falls below the sum of thermal noise within the estimated radar sweep bandwidth, noise figure of the WTRU, and a second configurable downlink resource reservation WTRU-INR margin for a second configurable consecutive period.

In embodiments, triggering of PUSCH/PUCCH/SRS/PRACH power control adjustment is performed to mitigate radar interference on a cell when the estimated radar interference on a cell exceeds the sum of thermal noise within the estimated radar sweep bandwidth, noise figure of the cell, and a configurable PUSCH/PUCCH/SRS/PRACH power control adjustment cell-INR margin for a configurable consecutive period, respectively.

In embodiments, PUSCH/PUCCH/SRS/PRACH power control adjustment of an eligible WTRU selection is performed to mitigate radar interference on a cell. The offset between the AoA of the radar interference and the direction of the SSB/CSI-RS beam the WTRU is associated with is smaller than or equal to a pre-configured angular threshold for PUSCH/PUCCH/SRS power control adjustment, respectively. The offset between the AoA of the radar interference and the direction of the SSB/CSI-RS beam the WTRU is associated with is larger than a second pre-configured angular threshold for PUSCH/PUCCH/SRS/PRACH power control adjustment, respectively.

In embodiments, triggering of PUSCH/PUCCH/SRS/PRACH power control adjustment is performed to mitigate WTRU interference on radar. The estimated aggregate WTRU interference on radar exceeds the sum of thermal noise within the estimated radar sweep bandwidth and a configurable PUSCH/PUCCH/SRS/PRACH power control adjustment radar-INR margin for a configurable consecutive period, respectively.

In embodiments, PUSCH/PUCCH/SRS/PRACH power control adjustment of an eligible WTRU selection is performed to mitigate WTRU interference on radar. The offset between the AoA of the radar interference and the direction of the SSB/CSI-RS beam the WTRU is associated with is smaller than or equal to a third pre-configured angular threshold for PUSCH/PUCCH/SRS power control adjustment, respectively. The offset between the AoA of the radar interference and the direction of the SSB/CSI-RS beam the WTRU is associated with is larger than a fourth pre-configured angular threshold for PUSCH/PUCCH/SRS/PRACH power control adjustment, respectively.

In embodiments, disabling of PUSCH/PUCCH/SRS/PRACH power control adjustment is performed when the estimated radar interference on a cell falls below the sum of thermal noise within the estimated radar sweep bandwidth, noise figure of the cell, and a second configurable PUSCH/PUCCH/SRS/PRACH power control adjustment cell-INR margin for a second configurable consecutive period, respectively. The estimated aggregate WTRU interference on radar falls below the sum of thermal noise within the estimated radar sweep bandwidth and a second configurable PUSCH/PUCCH/SRS/PRACH power control adjustment radar-INR margin for a second configurable consecutive period, respectively.

In embodiments, triggering of cell Tx power adjustment to mitigate gNB interference on radar is performed when the estimated aggregate gNB interference on radar exceeds the sum of thermal noise within the estimated radar sweep bandwidth and a configurable cell Tx power adjustment radar-INR margin for a configurable consecutive period.

In embodiments, disabling of cell Tx power adjustment is performed when the estimated aggregate gNB interference on radar falls below the sum of thermal noise within the estimated radar sweep bandwidth and a second configurable cell Tx power adjustment radar-INR margin for a second configurable consecutive period.

In embodiments, triggering of SSB/CORESET 0 relocation to mitigate gNB interference on radar is performed when the estimated aggregate gNB interference on radar exceeds the sum of thermal noise within the estimated radar sweep bandwidth and a configurable SSB/CORESET 0 relocation radar-INR margin for a configurable consecutive period.

In embodiments, triggering of SSB/CORESET 0 relocation to mitigate radar interference on the WTRU is performed when the estimated radar interference on the WTRU exceeds the sum of thermal noise within the estimated radar sweep bandwidth, noise figure of the WTRU, and a configurable SSB/CORESET 0 relocation WTRU-INR margin for a configurable consecutive period.

In embodiments, disabling of SSB/CORESET 0 relocation is performed when the estimated aggregate gNB interference on radar exceeds the sum of thermal noise within the estimated radar sweep bandwidth and a second configurable SSB/CORESET 0 relocation radar-INR margin for a second configurable consecutive period. The estimated radar interference on the WTRU exceeds the sum of thermal noise within the estimated radar sweep bandwidth, noise figure of the WTRU, and a second configurable SSB/CORESET 0 relocation WTRU-INR margin for a second configurable consecutive period. In embodiments, disabling criteria of SSB/CORESET 0 relocation is turned off such that SSB/CORESET 0 relocation may not be reverted by the disabling criteria.

In embodiments, triggering of PRACH relocation to mitigate radar interference on a cell is performed when the estimated radar interference on a cell exceeds the sum of thermal noise within the estimated radar sweep bandwidth, noise figure of the cell, and a configurable PRACH relocation cell-INR margin for a configurable consecutive period.

In embodiments, triggering of PRACH relocation to mitigate WTRU interference on radar is performed when the estimated aggregate WTRU interference on radar exceeds the sum of thermal noise within the estimated radar sweep bandwidth and a configurable PRACH relocation radar-INR margin for a configurable consecutive period.

In embodiments, disabling of PRACH relocation is performed when the estimated radar interference on a cell falls below the sum of thermal noise within the estimated radar sweep bandwidth, noise figure of the cell, and a second configurable PRACH relocation cell-INR margin for a second configurable consecutive period. The estimated aggregate WTRU interference on radar falls below the sum of thermal noise within the estimated radar sweep bandwidth and a second configurable PRACH relocation radar-INR margin for a second configurable consecutive period. Disabling criteria of PRACH relocation can be optionally turned off such that PRACH relocation may not be reverted by the disabling criteria.

In embodiments, triggering/disabling of PUCCH reconfiguration is performed when the estimated radar interference on a cell exceeds the sum of thermal noise within the estimated radar sweep bandwidth, noise figure of the cell, and a configurable PUCCH reconfiguration cell-INR margin for a configurable consecutive period.

In embodiments, triggering of PUCCH reconfiguration to mitigate WTRU interference on radar is performed when the estimated aggregate WTRU interference on radar exceeds the sum of thermal noise within the estimated radar sweep bandwidth and a configurable PUCCH reconfiguration radar-INR margin for a configurable consecutive period.

In embodiments, disabling of PUCCH reconfiguration is performed when the estimated radar interference on a cell falls below the sum of thermal noise within the estimated radar sweep bandwidth, noise figure of the cell, and a second configurable PUCCH reconfiguration cell-INR margin for a second configurable consecutive period. The estimated aggregate WTRU interference on radar falls below the sum of thermal noise within the estimated radar sweep bandwidth and a second configurable PUCCH reconfiguration radar-INR margin for a second configurable consecutive period. Disabling criteria of PUCCH reconfiguration can be optionally turned off such that PUCCH configuration may not be reverted by the disabling criteria.

In embodiments, triggering/disabling of SRS reconfiguration is performed to mitigate radar interference on a cell when the estimated radar interference on a cell exceeds the sum of thermal noise within the estimated radar sweep bandwidth, noise figure of the cell, and a configurable SRS reconfiguration cell-INR margin for a configurable consecutive period.

In embodiments, triggering of SRS reconfiguration to mitigate WTRU interference on radar is performed when the estimated aggregate WTRU interference on radar exceeds the sum of thermal noise within the estimated radar sweep bandwidth and a configurable SRS reconfiguration radar-INR margin for a configurable consecutive period.

In embodiments, disabling of SRS reconfiguration is performed when the estimated radar interference on a cell falls below the sum of thermal noise within the estimated radar sweep bandwidth, noise figure of the cell, and a second configurable SRS reconfiguration cell-INR margin for a second configurable consecutive period. The estimated aggregate WTRU interference on radar falls below the sum of thermal noise within the estimated radar sweep bandwidth and a second configurable SRS reconfiguration radar-INR margin for a second configurable consecutive period. In embodiments, disabling criteria of SRS reconfiguration is turned off such that SRS reconfiguration may not be reverted by the disabling criteria. Triggering/disabling of Paging reconfiguration.

In embodiments, the triggering of a paging reconfiguration is performed to mitigate gNB interference on radar when the estimated aggregate gNB interference on radar exceeds the sum of thermal noise within the estimated radar sweep bandwidth and a configurable Paging reconfiguration radar-INR margin for a configurable consecutive period.

In embodiments, the triggering of a paging reconfiguration is performed to mitigate radar interference on the WTRU when the estimated radar interference on the WTRU exceeds the sum of thermal noise within the estimated radar sweep bandwidth, noise figure of the WTRU, and a configurable Paging reconfiguration WTRU-INR margin for a configurable consecutive period.

In embodiments, a paging reconfiguration is disabled when the estimated aggregate gNB interference on radar exceeds the sum of thermal noise within the estimated radar sweep bandwidth and a second configurable Paging reconfiguration radar-INR margin for a second configurable consecutive period. The estimated radar interference on the WTRU exceeds the sum of thermal noise within the estimated radar sweep bandwidth, noise figure of the WTRU, and a second configurable paging reconfiguration WTRU-INR margin for a second configurable consecutive period. Disabling criteria of a paging enhancement can be optionally turned off such that a paging reconfiguration may not be reverted by the disabling criteria.

In embodiments, a PDCCH reconfiguration is triggered when the estimated aggregate gNB interference on radar exceeds the sum of thermal noise within the estimated radar sweep bandwidth and a configurable PDCCH reconfiguration radar-INR margin for a configurable consecutive period.

In embodiments, triggering of a PDCCH reconfiguration is performed to mitigate radar interference on the WTRU when the estimated radar interference on the WTRU exceeds the sum of thermal noise within the estimated radar sweep bandwidth, noise figure of the WTRU, and a configurable PDCCH reconfiguration WTRU-INR margin for a configurable consecutive period.

In embodiments, a PDCCH reconfiguration is disabled when the estimated aggregate gNB interference on radar exceeds the sum of thermal noise within the estimated radar sweep bandwidth and a second configurable PDCCH reconfiguration radar-INR margin for a second configurable consecutive period. The estimated radar interference on the WTRU exceeds the sum of thermal noise within the estimated radar sweep bandwidth, noise figure of the WTRU, and a second configurable PDCCH reconfiguration WTRU-INR margin for a second configurable consecutive period. Disabling criteria of PDCCH reconfiguration can be optionally turned off such that PDCCH reconfiguration may not be reverted by the disabling criteria.

Although features and elements are described above in particular combinations, one of ordinary skill in the art may appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for operating a wireless transmit/receive unit (WTRU) in a wireless network having a base station and which operates in reception range of narrowband interference comprising:

receiving a command from the base station to perform at least one of uplink or downlink beam nulling, and performing at least one of uplink or downlink beam nulling based on the command, wherein the command is based on an estimated narrowband interference exceeding a pre-determined power threshold, and wherein the command is based on an angle of arrival offset between the estimated narrowband interference with respect to the base station and a location of the WTRU with respect to the base station being within predetermined high and low angle of arrival offset thresholds.

2. The method of claim 1, wherein the command is a command to perform transmit beam nulling on at least one of a sounding reference signal (SRS), a physical uplink shared channel (PUSCH) and a physical uplink control channel/demodulation reference signal (PUCCH/DMRS).

3. The method of claim 2, wherein the command includes one or more beam nulling angles.

4. The method of claim 1, wherein the command is a command to perform receive beam nulling on a Channel Start Information Reference Signal (CSI-RS), a physical downlink shared channel/demodulation reference signal (PDSCH/DMRS) and a physical downlink control channel/demodulation reference signal (PDCCH/DMRS).

5. The method of claim 4, wherein the command includes one or more beam nulling angles.

6. The method of claim 1, wherein the command is one of a medium access control element (MAC-CE), radio resource control (RRC), dedicated or group common downlink control information (DCI) signaling for RRC connected WTRUs, or a paging system information (SI) modification short message in (DCI) format for idle or inactive WTRUs.

7. The method of claim 1, further comprising estimating an angle of arrival of the estimated narrowband interference by the WTRU.

8. The method of claim 1, further comprising transmitting a beam nulling ability status.

9. A wireless transmit/receive unit (WTRU) comprising:

a processor; and a transceiver, the processor and transceiver configured to receive a command to perform at least one of uplink beam nulling or downlink beam nulling, and the transceiver configured to perform the at least one of uplink beam nulling or downlink beam nulling based on the command, wherein the command is based on an estimated narrowband interference exceeding a pre-determined power threshold, and wherein the command is based on an angle of arrival offset between the estimated narrowband interference with respect to a base station and a location of the WTRU with respect to the base station being within predetermined high and low angle of arrival offset thresholds.

10. The WTRU of claim 9, wherein the command includes one or more beam nulling angles.

11. The WTRU of claim 9, wherein the command is a command to perform transmit beam nulling on SRS, PUSCH and PUCCH/DMRS.

12. The WTRU of claim 9, wherein the processor and receiver are further configured to estimate an angle of arrival of the estimated narrowband interference.

13. The WTRU of claim 9, wherein the command is one of a MAC-CE, RRC, dedicated or group common DCI signaling, or a paging short message in DCI format.

14. The method of claim 1, wherein the command is further based on the estimated narrowband interference overlapping with a scheduled physical resource block associated with the WTRU.

15. The WTRU of claim 9, wherein the command is further based on the estimated narrowband interference overlapping with a scheduled physical resource block associated with the WTRU.

16. A method for operating a base station in a wireless network having a WTRU which operates in reception range of narrowband interference comprising:

transmitting a command to a WTRU to perform at least one of uplink or downlink beam nulling, and wherein the command is based on an estimated narrowband interference exceeding a pre-determined power threshold, and wherein the command is based on an angle of arrival offset between the estimated narrowband interference with respect to the base station and a location of the WTRU with respect to the base station being within predetermined high and low angle of arrival offset thresholds.

17. The method of claim 16, wherein the command includes one or more beam nulling angles.

18. The method of claim 16, further comprising estimating an angle of arrival of the narrowband interference.

19. The method of claim 1, wherein the command is a command to perform receive beam nulling on at least one of a sounding reference signal (SRS), a physical uplink shared (PUSCH) and a physical uplink control channel/demodulation reference signal (PUCCH/DMRS) CS-RS, PDSCH/DMRS and PDCCH/DMRS.

20. The method of claim 16, wherein the command is one of a medium access control element (MAC-CE), a radio resource control (RRC), a dedicated or group common downlink control information (DCI) signaling for RRC connected WTRUs, or a paging system information (SI) modification short message in (DCI) format for idle or inactive WTRUs.

* * * * *